(12) United States Patent
Viswanathan et al.

(10) Patent No.: US 8,730,210 B2
(45) Date of Patent: May 20, 2014

(54) MULTIPOINT SOURCE DETECTION IN A SCANNED BEAM DISPLAY

(75) Inventors: P. Selvan Viswanathan, Redmond, WA (US); Mark Champion, Kenmore, WA (US); David Lashmet, Bainbridge Island, WA (US)

(73) Assignee: Microvision, Inc., Redmond, WA (US)

( * ) Notice: Subject to any disclaimer, the term of this patent is extended or adjusted under 35 U.S.C. 154(b) by 442 days.

(21) Appl. No.: 13/276,561

(22) Filed: Oct. 19, 2011

(65) Prior Publication Data

US 2013/0100075 A1   Apr. 25, 2013

(51) Int. Cl.
*G06F 3/042* (2006.01)

(52) U.S. Cl.
USPC ......................................................... 345/175

(58) Field of Classification Search
CPC ............................ G06F 3/0423; H04N 9/3129
USPC ........................................................ 345/175
See application file for complete search history.

(56) References Cited

U.S. PATENT DOCUMENTS

| 5,525,764 | A | * | 6/1996 | Junkins et al. | 178/18.01 |
| 5,793,361 | A | * | 8/1998 | Kahn et al. | 345/179 |
| 6,404,416 | B1 | * | 6/2002 | Kahn et al. | 345/158 |
| 7,768,505 | B2 | * | 8/2010 | Ishihara | 345/175 |
| 2002/0219262 | | | 9/2009 | Champion et al. | |

* cited by examiner

*Primary Examiner* — Dorothy Harris
(74) *Attorney, Agent, or Firm* — Kevin D. Wills

(57) ABSTRACT

Briefly, in accordance with one or more embodiments, an image or projection cone is projected onto a projection surface via a raster scan to generate the image, or in a light cone. Movements of two or more input sources with respect to projection cone are detected, and a determination is made whether the input sources have crossed a crossover line in the projection cone. If the input sources have moved greater than a threshold amount after crossing the crossover line, position data between the input sources may be exchanged to reflect proper position data for the input sources.

18 Claims, 17 Drawing Sheets

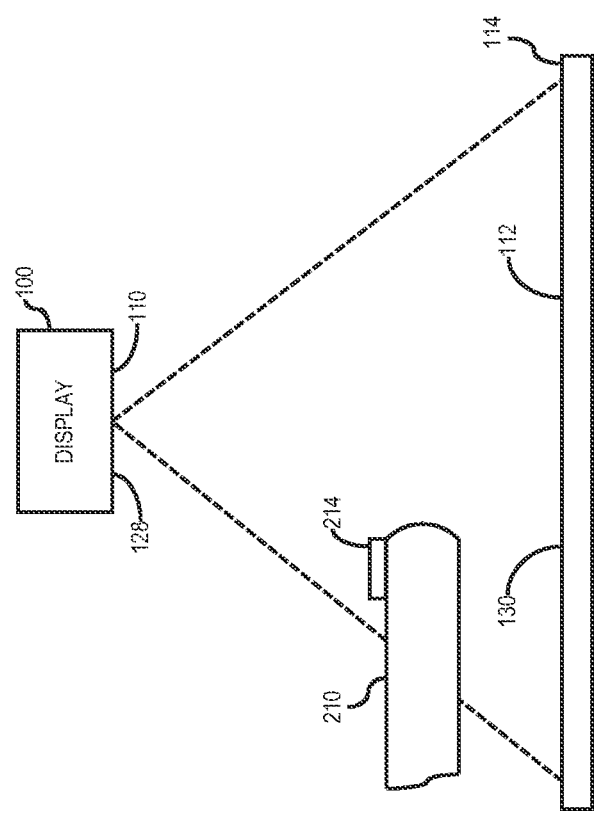

MULTIPOINT SOURCE DETECTION IN A SCANNED BEAM DISPLAY

BACKGROUND

In a scanned beam display or the like, a touch or input may be detected via introducing passive interference, for example using a reflector or retroreflector in the projection cone or on the projection surface. The interference may be detected by appropriate circuitry and decoded to correspond to the physical location of the input devices in a two-dimensional plane with respect to the projected image as X-Y coordinates. The detected interference may then be indicated as a pointer event or a touch event to a video rendering engine to overlay the position of the input device in the projected image or to actuate an event, for example via gesturing. When multiple input devices are utilized, the position of the respective input devices may be determined. However, when the input devices cross over an imaginary horizontal line any where in the scanned region, the ability to accurately track the individual input devices may be lost or their coordinates inadvertently may be swapped, and as a result the wrong X-Y coordinates may be associated with the wrong input device.

The reason such "swapping" might happen is due to the nature by which the coordinates of the input devices are detected, tagged to or associated with an input device, and passed along to the application layer. This tagging occurs in the time domain, and temporal separation between the input devices is what yields a unique tag. However, when the input device violates this temporal relationship if the relative positions of the input devices along the raster scan are swapped, then their tags will also be inadvertently swapped. Thus, detection and correction of such temporal violations should be accounted for in order to maintain the integrity of the tags with a corresponding input device.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

FIG. 4 is a diagram of a scanned beam display or the like capable of detecting inputs from multiple fingers as shown in FIG. 2 wherein the fingers include passive input devices in accordance with one or more embodiments;

Figure 6A:
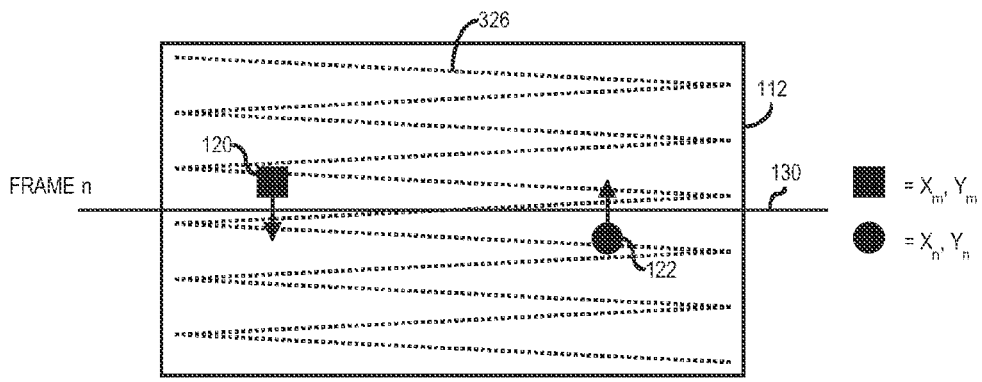
Figure 6B:
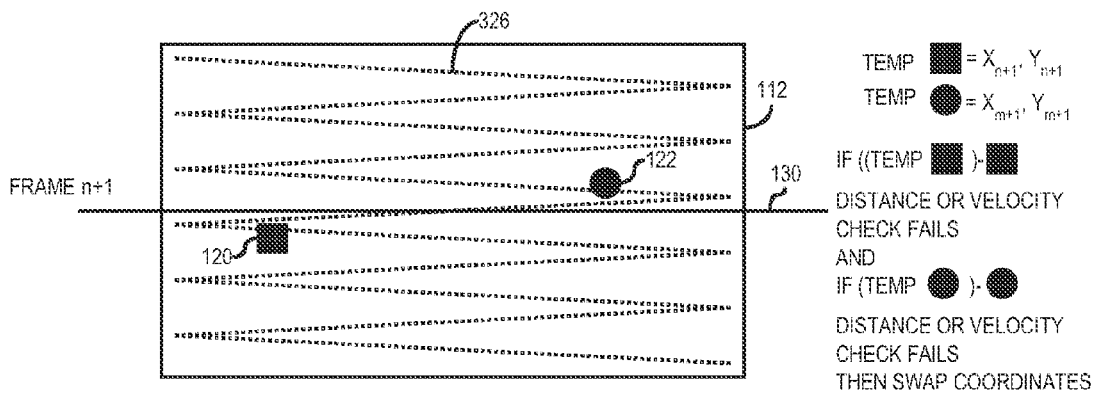
Figure 7:
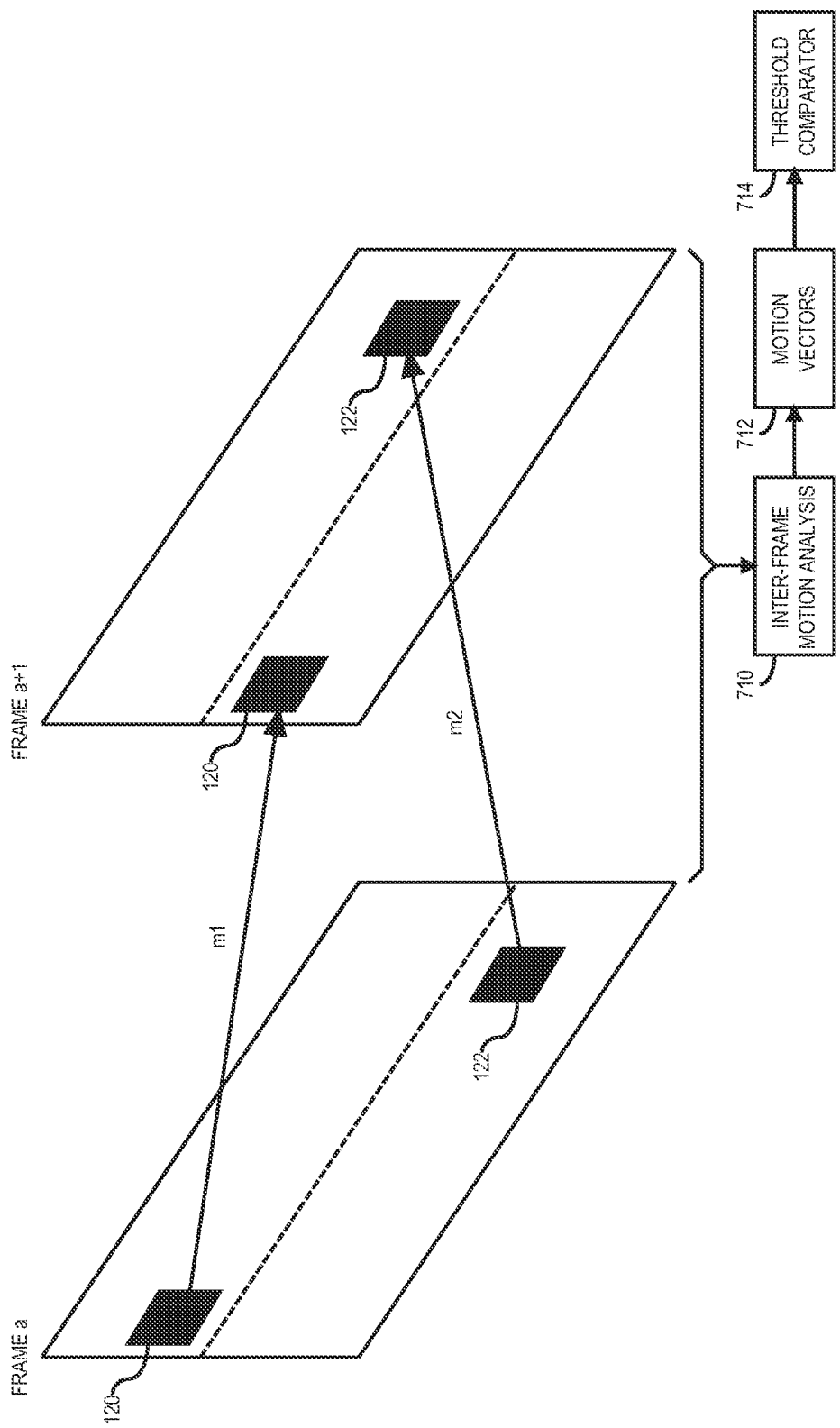
Figure 8:
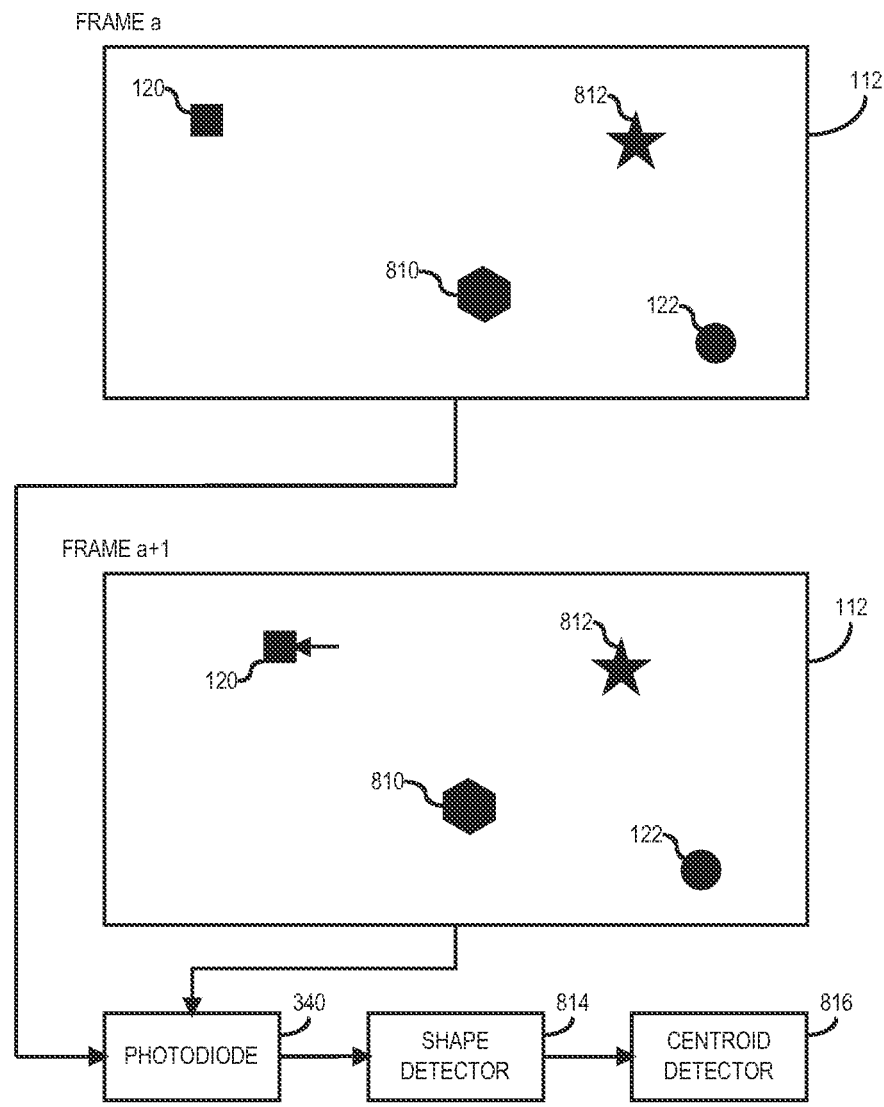
Figure 9:
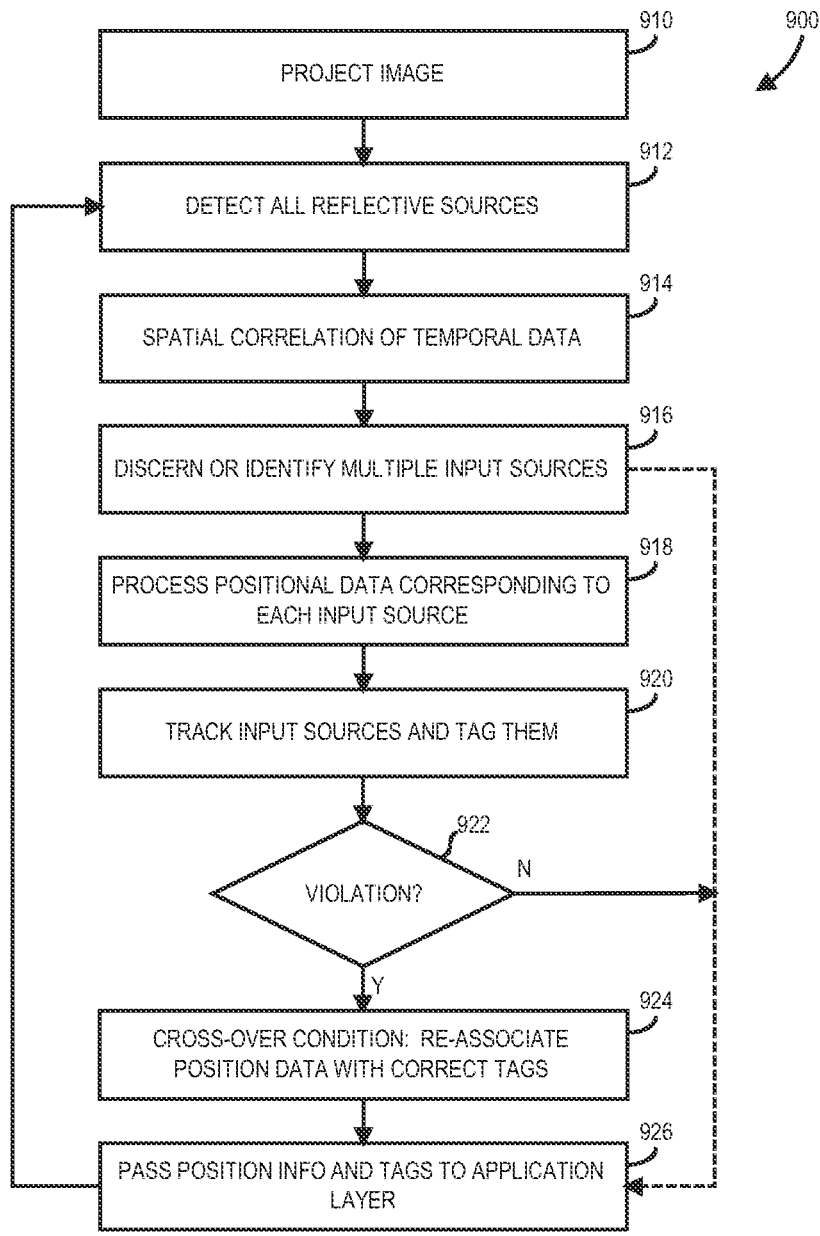
Figure 10:
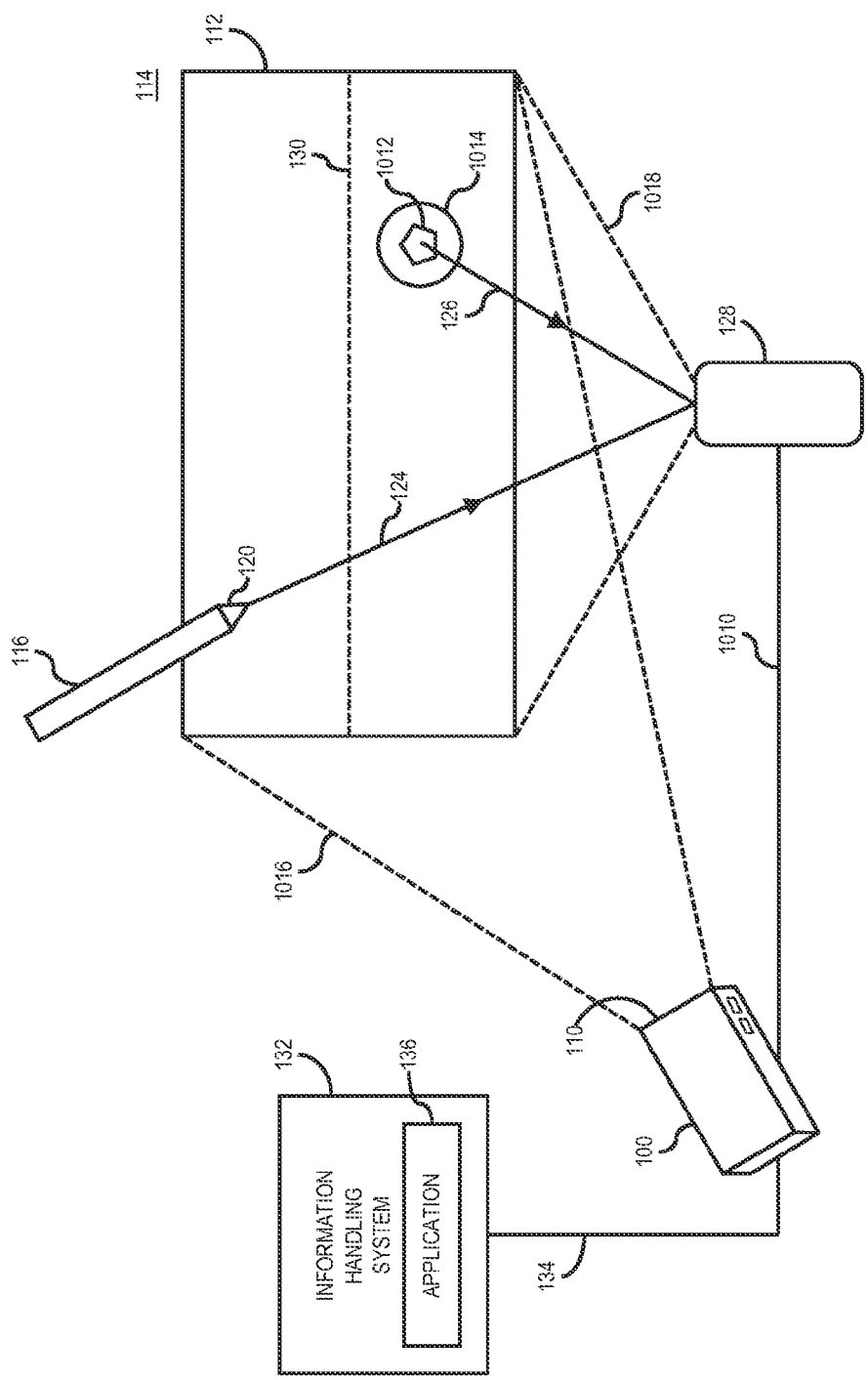
Figure 11:
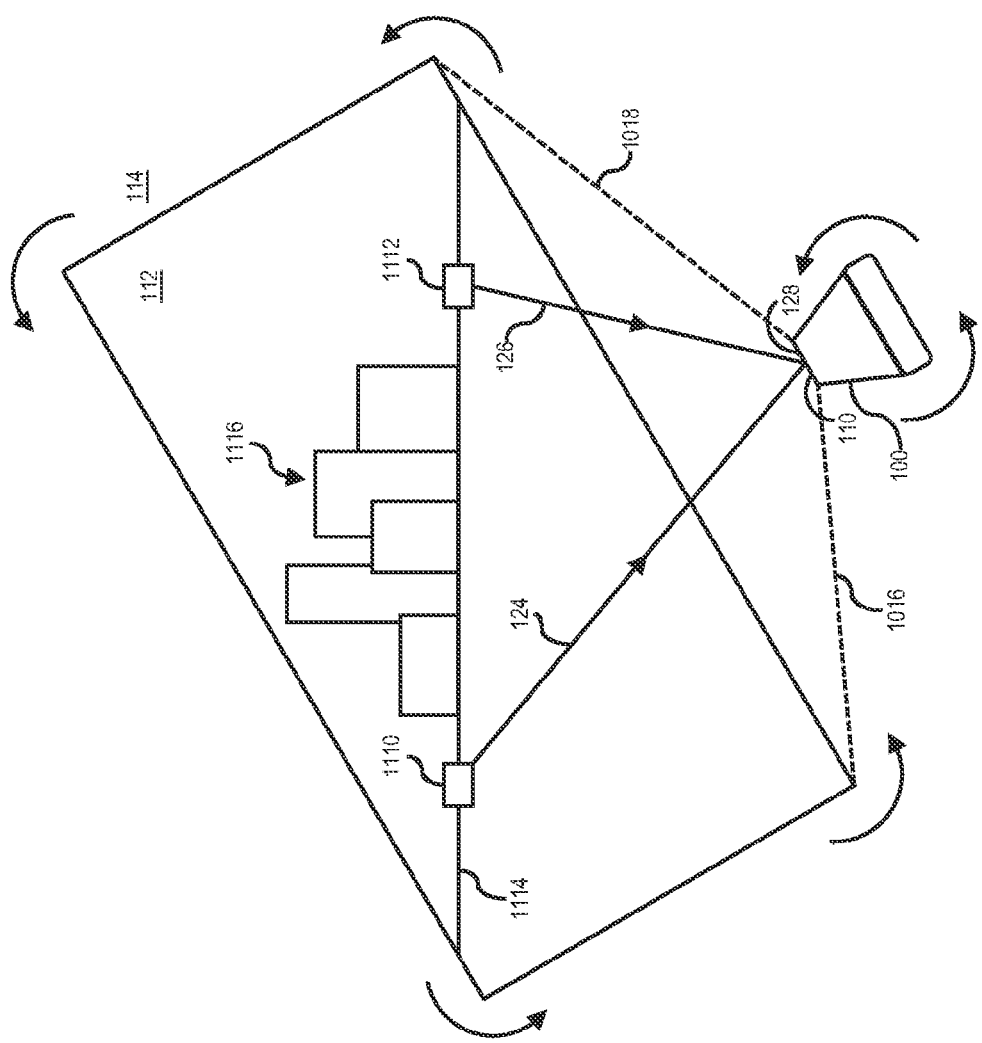
Figure 12:
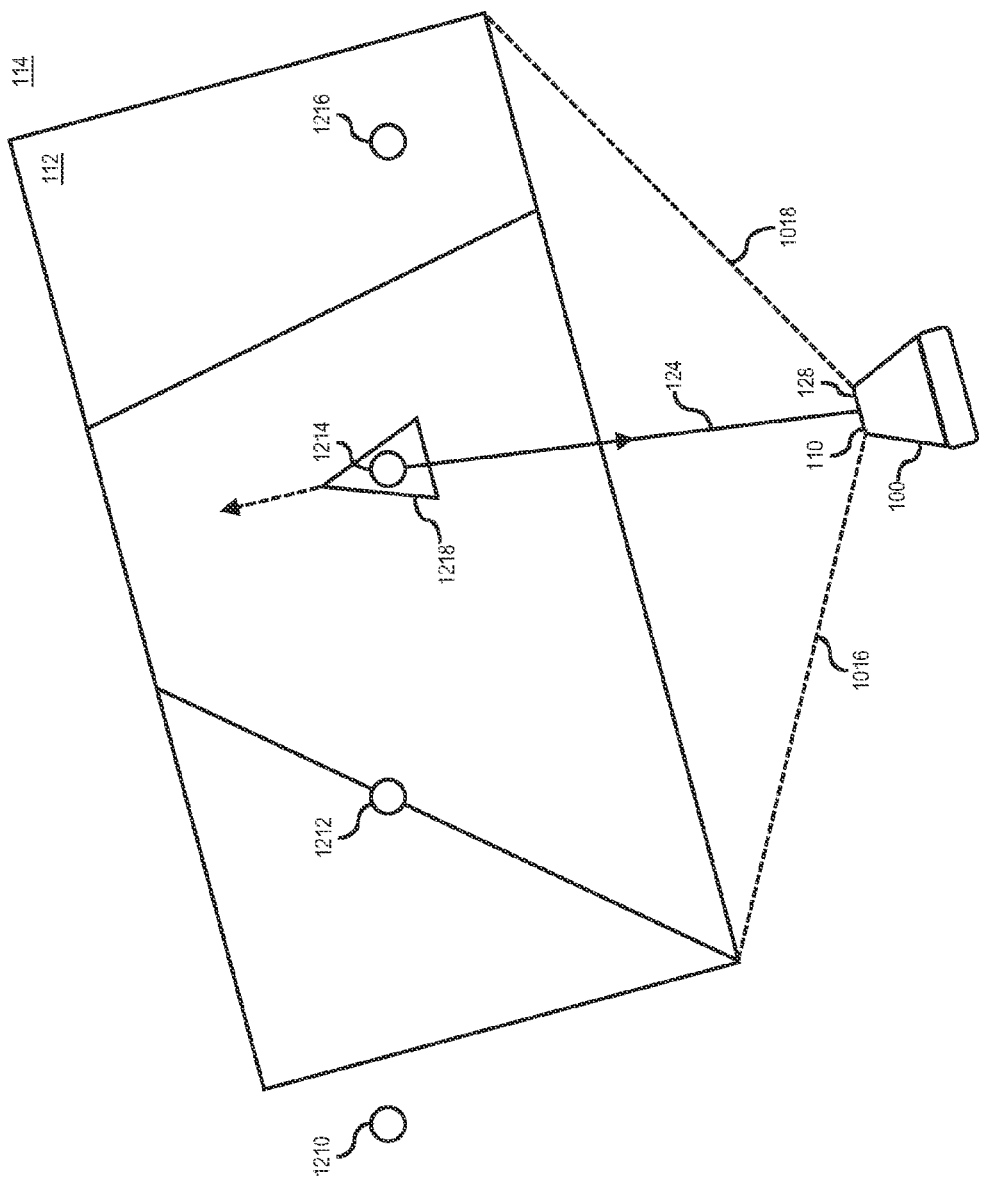
Figure 13:
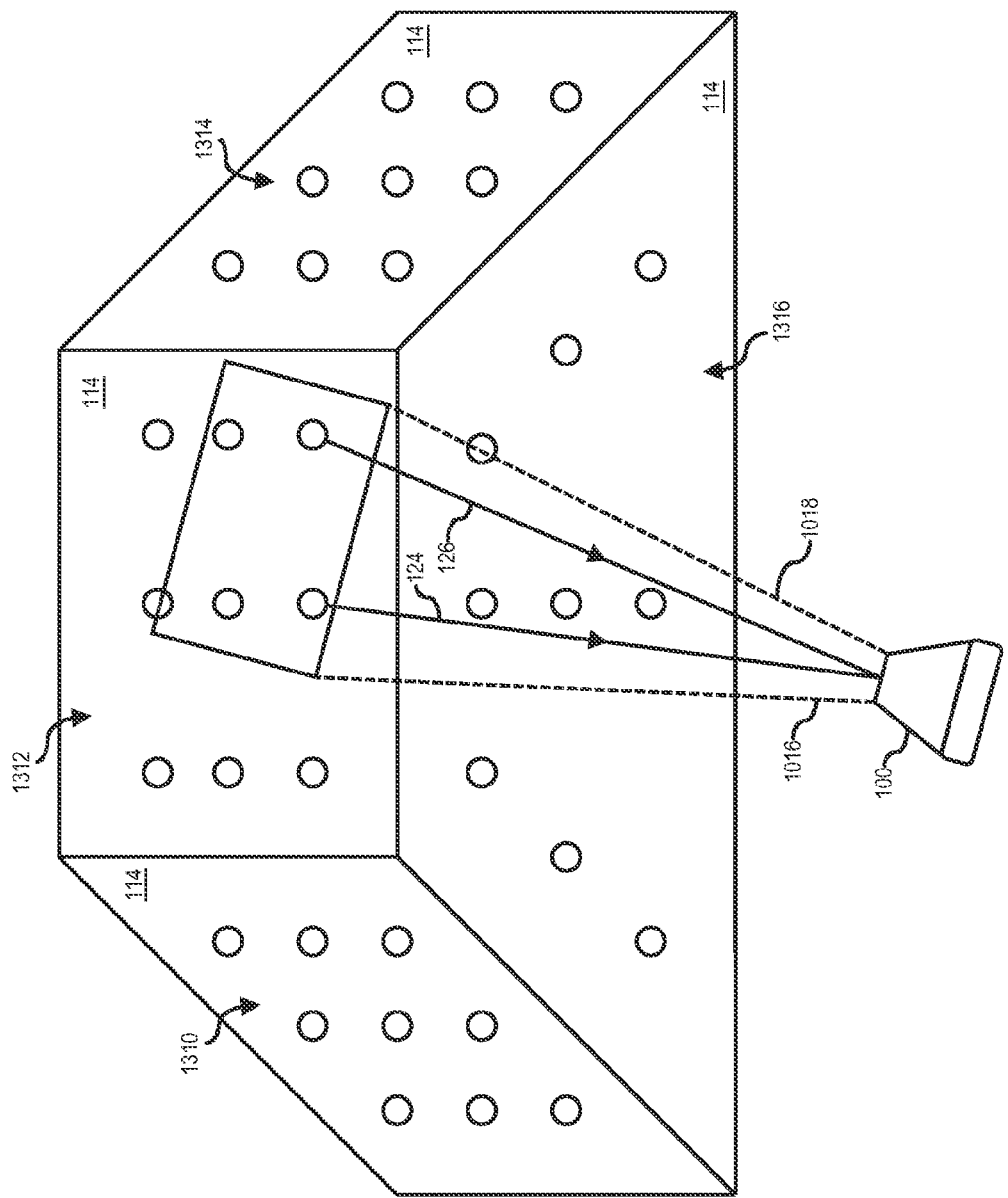
Figure 14:
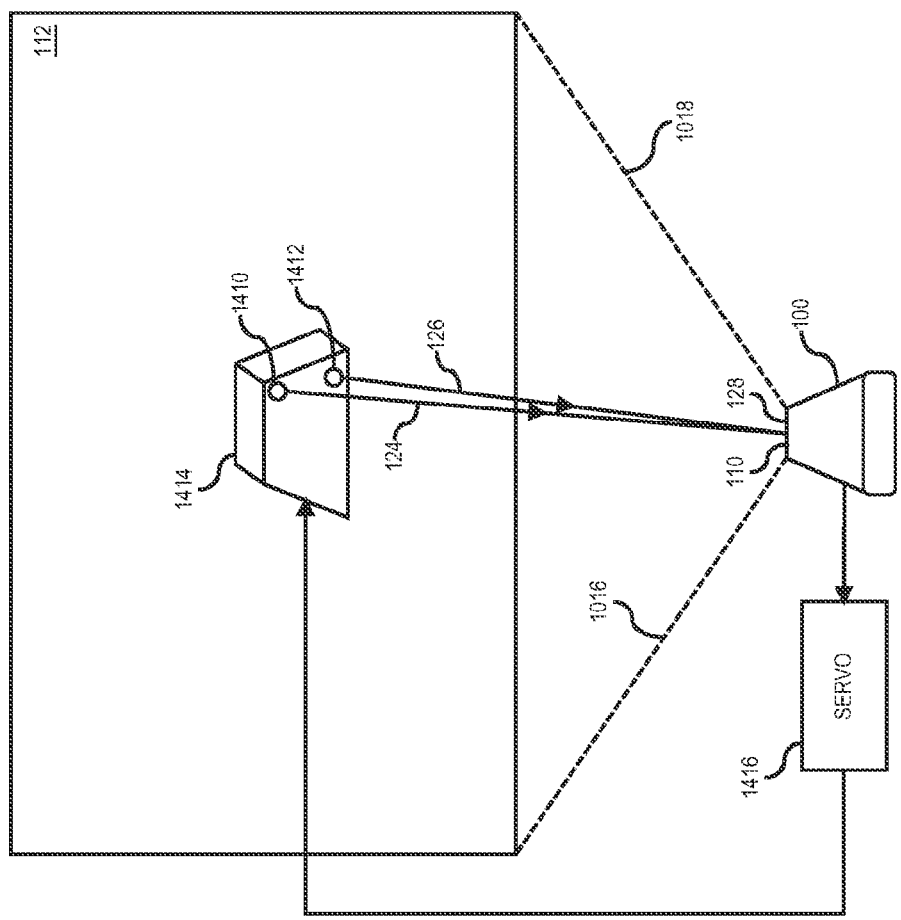
Figure 15:
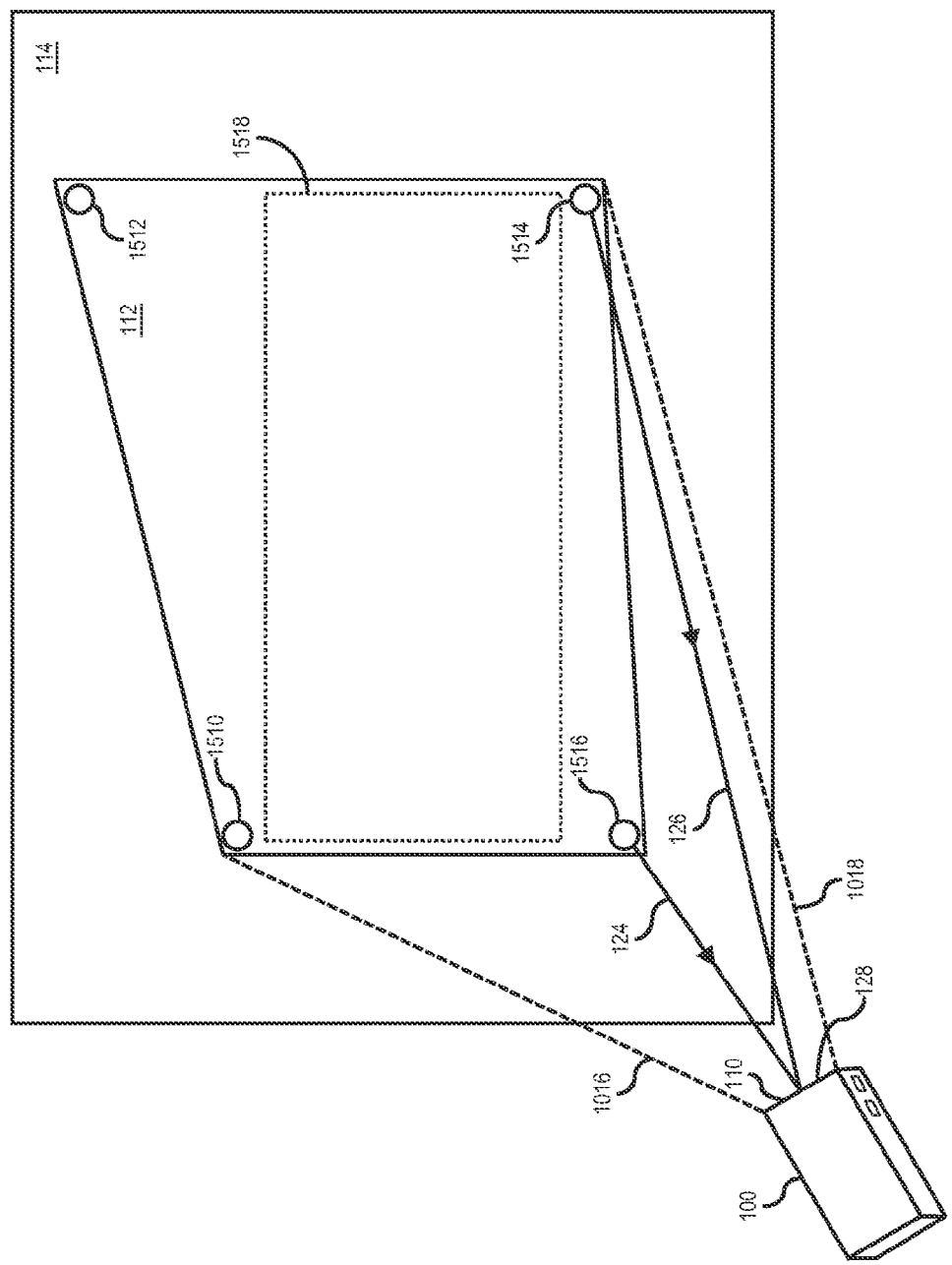
Figure 16:
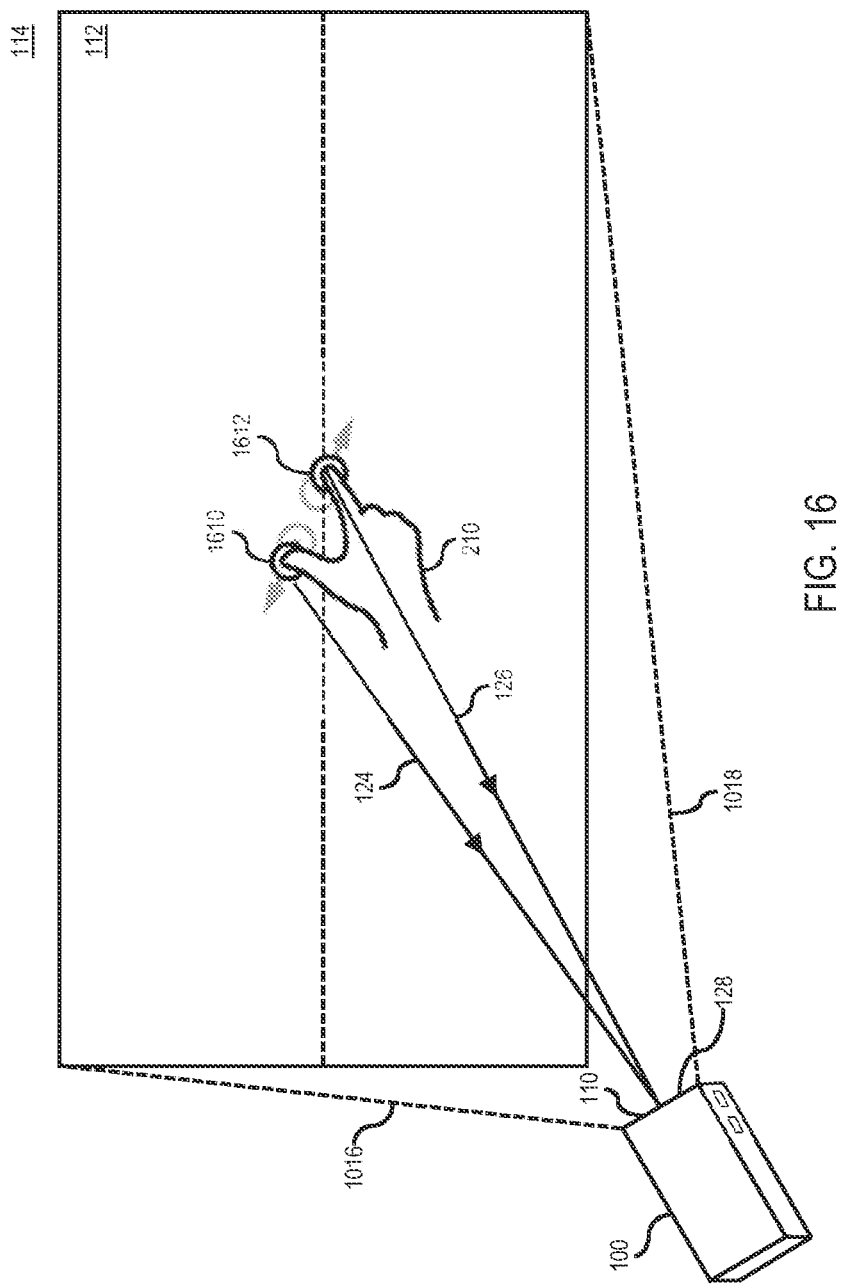
Figure 17:
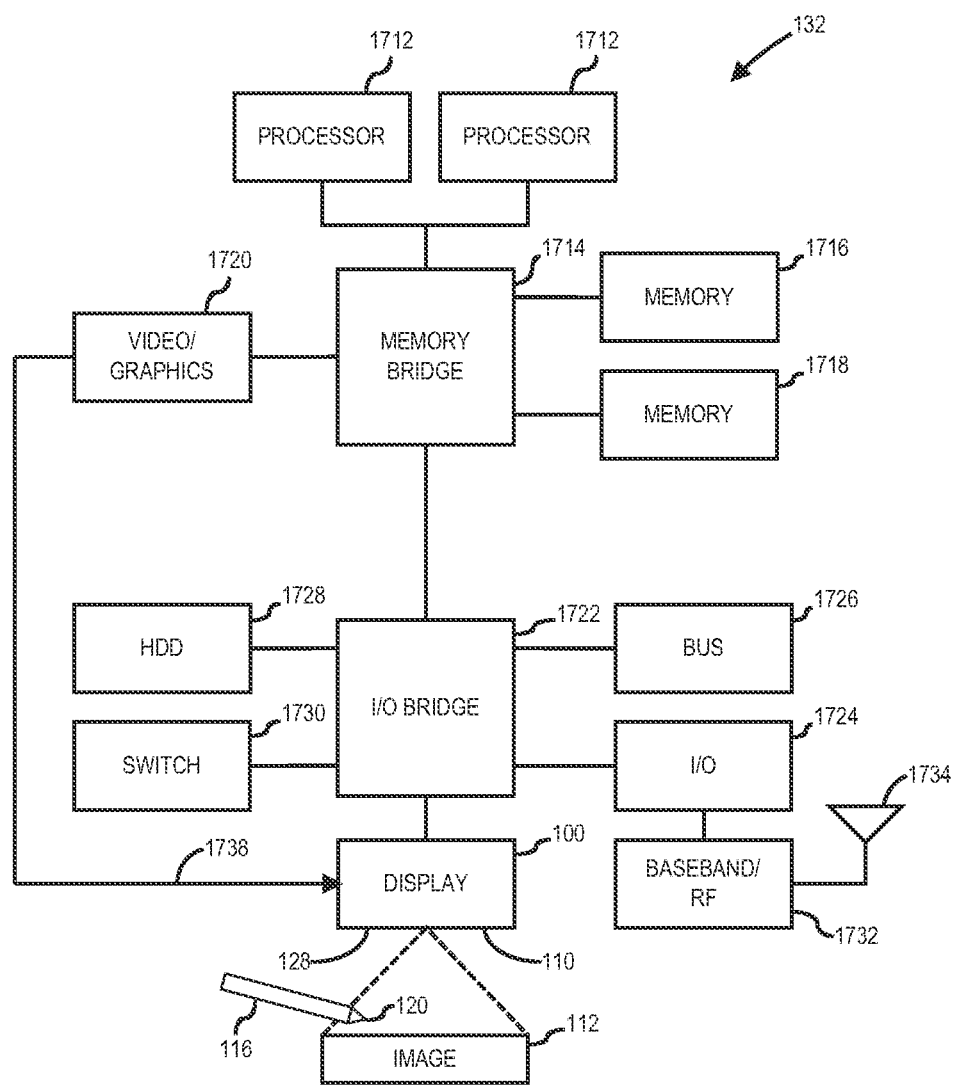

FIGS. 6A-B are diagrams illustrating an approach to tracking for multiple input sources using a history between successive frames in accordance with one or more embodiments;

FIG. 7 is a diagram illustrating an alternative approach to tracking multiple input sources using inter-frame motion analysis in accordance with one or more embodiments;

FIG. 8 is a diagram illustrating an alternative approach to tracking multiple input sources using shape detection analysis in accordance with one or more embodiments;

FIG. 9 is a flow diagram of a method to track and accommodate multiple input sources in accordance with one or more embodiments;

FIG. 10 is a diagram of a scanned beam display or the like capable of detecting and tracking multiple input sources wherein the detector is decoupled from the projector in accordance with one or more embodiments;

FIG. 11 is a diagram of a scanned beam display or the like capable of maintaining the image in a fixed orientation while the projected area is moved in accordance with one or more embodiments;

FIG. 12 is a diagram of a scanned beam display or the like capable of maneuvering a vehicle within the image by maintain the vehicle in a fixed position while the projected image is moved with respect to the vehicle via movement the projected area in accordance with one or more embodiments;

FIG. 13 is a diagram using multiple surfaces of a room as a projection surface for implementing a virtual display in accordance with one or more embodiments;

FIG. 14 is a diagram of using a projector to provide closed loop position control of a physical object in accordance with one or more embodiments;

FIG. 15 is a diagram of geometric image correction and/or warping of projected content displayed on a projection surface in accordance with one or more embodiments;

FIG. 16 is a diagram of a projection system utilized to implement pinch zooming and/or rotating of projected content in accordance with one or more embodiments; and FIG. 17 is a block diagram of an information handling system coupled to a scanned beam display to track and accommodate multiple input sources in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Figure 1:
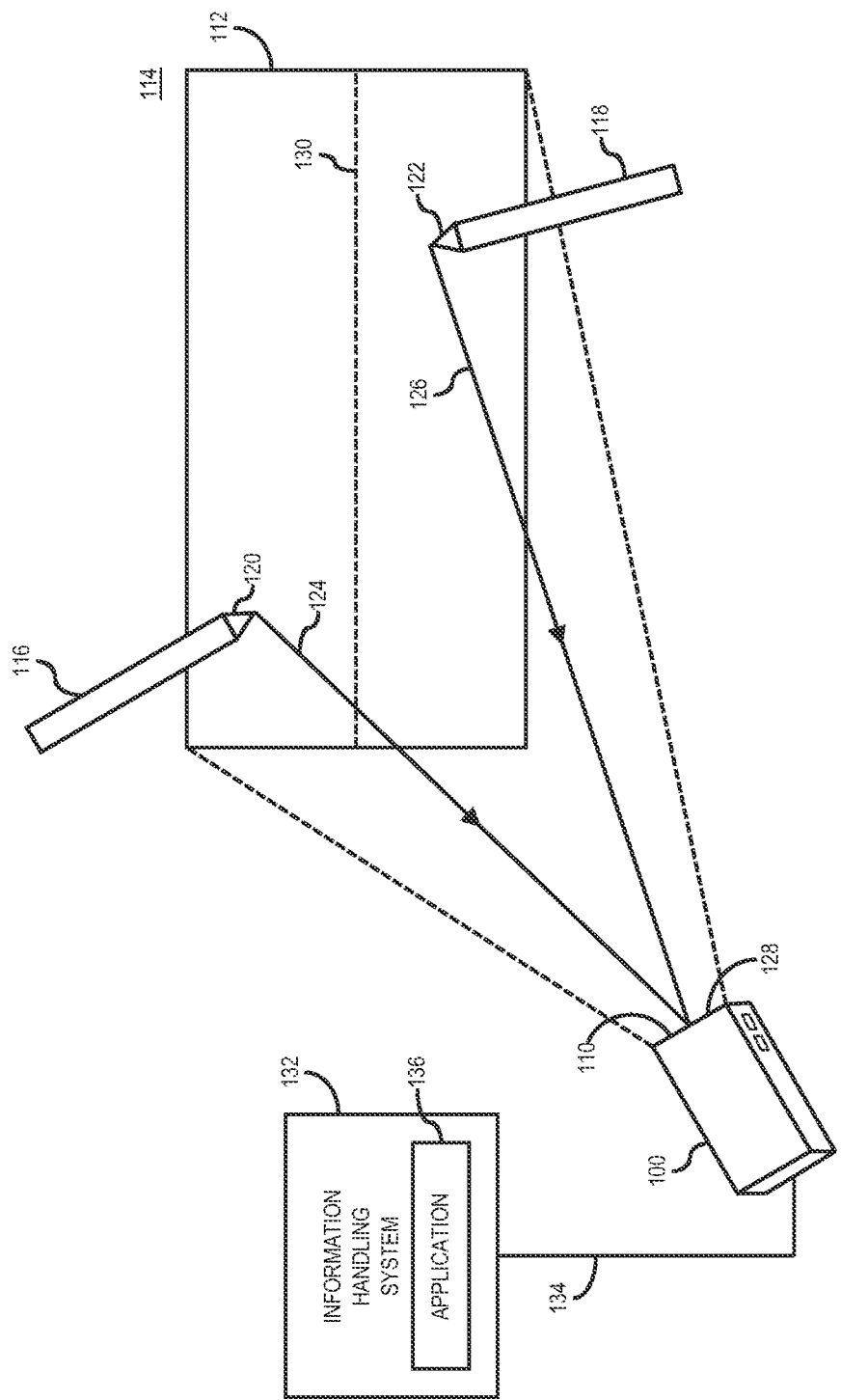
FIG. 1 is a diagram of a scanned beam display or the like capable of detecting inputs from multiple styluses in accordance with one or more embodiments.
Figure 3:
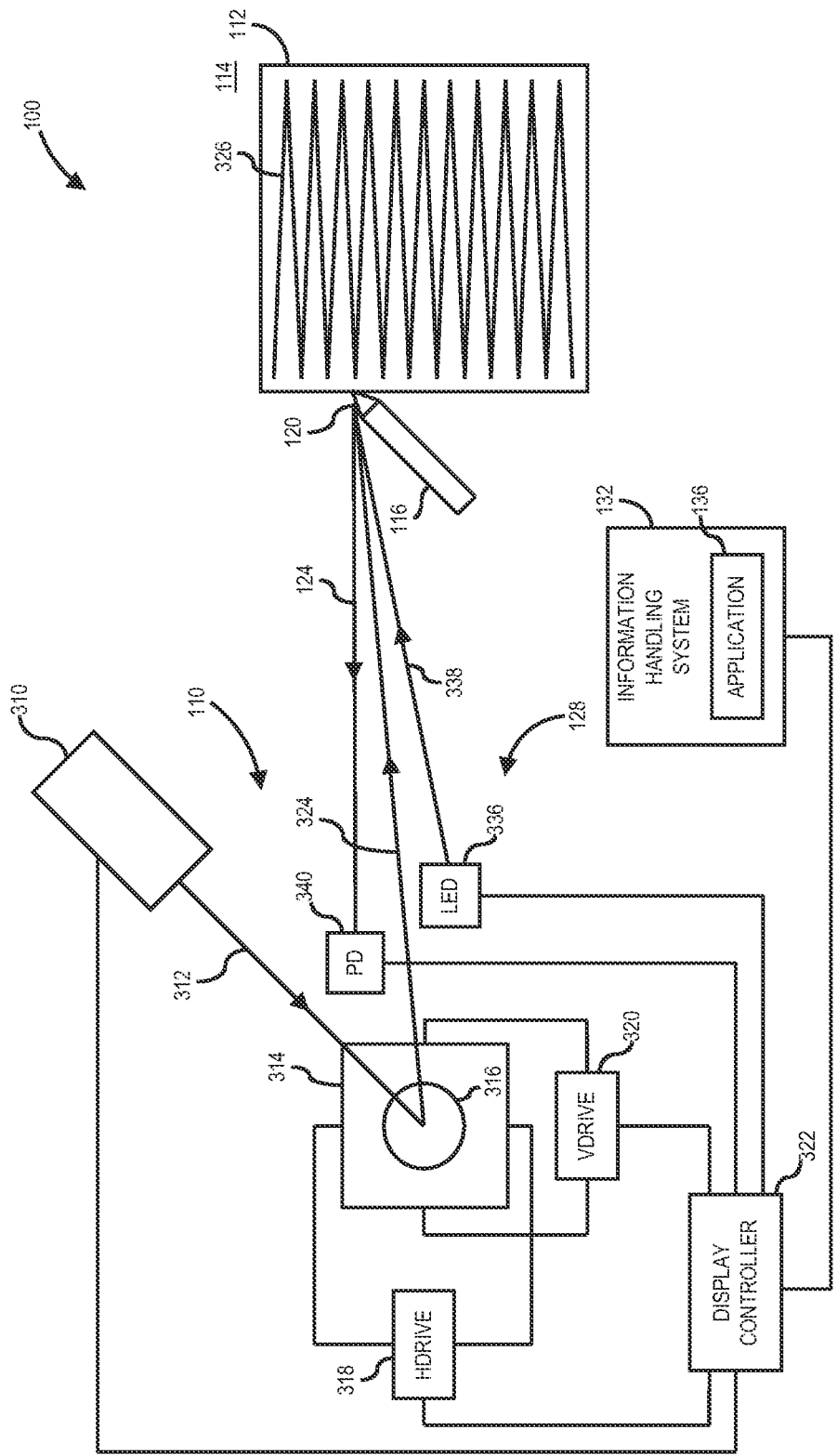
FIG. 3 is a diagram of a scanned beam display or the like capable of detecting inputs from multiple styluses as shown in FIG. 1 or multiple fingers as shown in FIG. 2 in accordance with one or more embodiments.

Referring now to FIG. 1, a diagram of a scanned beam display capable of detecting inputs from multiple styluses in accordance with one or more embodiments will be discussed. As shown in FIG. 1, scanned beam display 100 comprises a projector 110 that is capable of projecting an image 112 onto a projection surface 114. As discussed in further detail with respect to FIG. 3, below, the projector 110 may generate the image 112 by scanning a laser beam in a raster pattern by sweeping the beam along two orthogonal axes. It should be noted that while FIG. 1 and FIG. 3, below, illustrate a scanned beam display for purposes of example, other types of displays may likewise be utilized with the subject matter discussed herein, and the scope of the claimed subject matter is not limited in this respect. Scanned beam display system (display) 100 may be configured to operate with one or more styluses such as stylus 116 and stylus 118 wherein the styluses have an optical device 120 and 122, respectively, disposed at one end that are capable of providing position indicating beams 124 and 126, respectively, that are capable of being detected by a detector 128 of the scanned beam display 100. In one or more alternative embodiments, stylus 116 or stylus 118 may comprise active styluses that do not reflect position indicating beams 124 or 126. Instead, in such embodiments, a photodiode (PD) 340 such as shown in FIG. 3, below may be located outside of the display 100 wherein position information may be obtained by a light emitting diode (LED) 336 as shown in FIG. 3, below, or a similar device flashing video vertical sync (VSYNC) and horizontal sync (HSYNC) signals out-of-band of the main displayed video content, for example where LED 336 emits light in the infrared spectrum. Alternatively, in the event LED 336 is not utilized, on or more active styluses may be utilized for position indicating and detecting by capturing the light of the generated image itself projected by the display 100, and the then regenerating and sending beams 124 or 126 back to display 100 as virtual beams. Such a system is shown and described in U.S. application Ser. No. 12/466,318 filed May 14, 2009 and published as US 2009/0129262. Said application Ser. No. 12/466,318 is hereby incorporated herein by reference in its entirety.

In one or more embodiments, the optical devices 120 and 122 of the styluses comprise passive devices such as a reflector or retroreflector wherein the position indicating beams are reflected off of the passive optical devices 120 and 122 to be detected by the detector 128. The detector 128 may be coupled to circuitry that is capable of determining a position of the styluses with respect to the projected image 112 in response to the detector 128 detecting the position indicating beams 124 and 126, for example by calculating the X-Y coordinates of the respective optical devices 120 and 122 within the X-Y coordinate field of the displayed image 112. The circuitry coupled to the detector 128 may track the unique X-Y coordinates corresponding to the individual styluses so that a given stylus may be identified by scanned beam display 100. As the styluses are moved around with respect to the projected image, detector 128 may detect the updated positions of the optical devices 120 and 122. However, in a passive system, when one or both of the styluses 116 and 118 are moved across a crossover boundary 130, which for example may comprise a midline across the projected image 112, the coordinate positions of the optical devices may inadvertently get swapped such that the scanned beam display 100 may lose track of which stylus corresponds to which coordinate position. Other extreme movements of the optical devices 120 and 122 may likewise cause scanned beam display 100 to lose track of a true coordinate position of one or more of the optical devices. In accordance with one or more embodiments, scanned beam display 100 is capable of determining when one or more of the optical devices 120 and 122 are moved across a crossover boundary 130 and/or when the movements of the optical devices are greater than usual so that the calculated positions may be properly processed and accounted for to provide a more accurate coordinate position and identification of the optical devices 120 and 122.

In one or more embodiments, scanned beam display 100 may be capable of detecting and tracking the movements of styluses 116 and 118 as discussed herein, as a stand-alone device without requiring the scanned beam display 100 to couple to another device. In one or more alternative embodiments, scanned beam display 100 may be coupled to an information handling system 132 via link 134 which may comprise a wired link, a wireless link such as a radio-frequency (RF) link, or an optical link. Information handling system 132 may comprise a computer such as a laptop or desktop computer, a tablet, a notebook, a media player such as an MP3 player, or a cellular telephone, among several examples. An example information handling system is shown in and described in further detail with respect to FIG. 10, below. The scanned beam display 100 may be controlled by an application 136 running on the information handling system 132 to provide the image 112 projected by scanned beam display 100, and may also process the position data of the multiple input sources comprising the optical devices 120 and 122 of styluses 116 and 118. For example, application 136 may comprise a video game wherein video game images 112 are projected onto surface 114, and the user or users control the video game and interact with the game and/or the projected images 112 via the styluses as part of the game play. Alternatively, application 136 may comprise a presentation application for presenting information and/or data to an audience by projecting images 112 onto the surface 114 that are viewable by the audience. The presenter and/or audience may control the presentation application and/or otherwise interact with the presentation application via styluses 116 and 118, the movements of which are detected and tracked by scanned beam display 100 via detector 128 and passed to application 136. However, these are merely examples for application 136, and the scope of the claimed subject matter is not limited in this respect. An example projector 110 and position detector 128 of a scanned beam display 100 capable of providing such coordinate position adjustments and identifications are shown in and described with respect to FIG. 3, below. An alternative embodiment in which fingers may be utilized instead of styluses is shown in and described with respect to FIG. 2, below.

Figure 2:
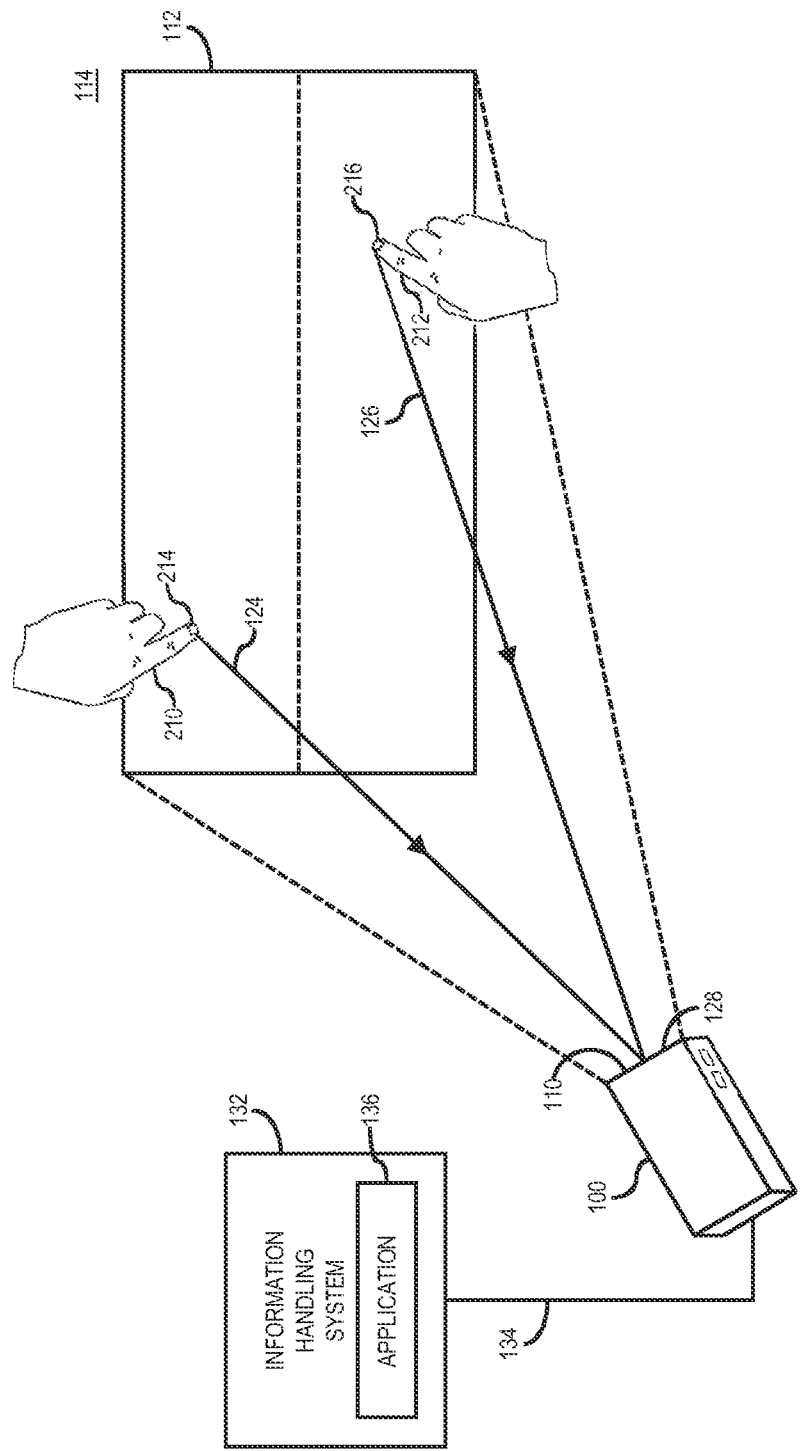
FIG. 2 is a diagram of a scanned beam display or the like capable of detecting inputs from multiple fingers in accordance with one or more embodiments.

Referring now to FIG. 2, a diagram of a scanned beam display capable of detecting inputs from multiple fingers in accordance with one or more embodiments will be discussed. The system utilizing a scanned beam display 100 shown in FIG. 2 is substantially the same as the system shown in FIG. 1, except that detector 128 may be capable of detecting movements of multiple fingers 210 and 212 in lieu of styluses. The system shown in FIG. 2 may comprise a passive system to detect the fingers 210 and 212 via position detection beams 124 and 126 in a manner similar to how the detection beams are detected from the optical devices 120 and 122 of FIG. 1. In the embodiment shown in FIG. 2, optical devices 214 and 216 may be reflectors or retroreflectors to reflect the position indicating beams to detector 128. In some embodiments, the detector 128 may merely detect the position indicating beams 124 and 126 that are reflected off the fingernail of the fingers 210 and 212. Alternatively, the optical devices 214 and 216 may be disposed on a ring, thimble, or glove that is worn on the fingers or hands of the user. Furthermore, as discussed with respect to the styluses of FIG. 1, the user may wear an active stylus on his finger, for example on a glove, ring, or fingertip type device, and such an active stylus worn on the user's finger may operate substantially similarly to how an active stylus may operate as discussed herein. However, these are merely example detection systems and optical devices, and the scope of the claimed subject matter is not limited in this respect. In any event, scanned beam display 100 of FIG. 2 is capable of determining when one or more of the optical devices 214 and 216 of fingers 210 and 212 are moved across a crossover boundary 130 and/or when the movements of the optical devices are greater than usual so that the calculated positions may be properly processed and accounted for to provide a more accurate coordinate position and identification of the optical devices 214 and 216. An example projector 110 and position detector 128 of a scanned beam display 100 capable of providing such coordinate position adjustments and identifications are shown in and described with respect to FIG. 3, below.

Referring now to FIG. 3, a diagram of a scanned beam display capable of detecting inputs from multiple styluses as shown in FIG. 1 or multiple fingers as shown in FIG. 2 in accordance with one or more embodiments will be discussed. Although FIG. 3 shows a scanned beam display for purposes of example and discussion, it should be noted that the subject matter discussed herein may be utilized with displays other than a scanned beam display, and the scope of the claimed subject matter is not limited in this respect. As shown in FIG. 2, the projector 110 of scanned beam display 100 comprises a light source 310, which may be a laser light source such as a laser or the like, capable of emitting a beam 312 which may comprise a laser beam. The beam 312 impinges on a scanning platform 314 which may comprise a microelectromechanical (MEMS) based scanner or the like, and reflects off of scanning mirror 316 to generate a controlled output beam 324. A horizontal drive circuit 318 and a vertical drive circuit 320 modulate the direction in which scanning mirror 316 is deflected to cause output beam 324 to generate a raster scan 326, thereby creating a displayed image 112 on a projection surface 114. A display controller 322 controls horizontal drive circuit 318 and vertical drive circuit 320 by converting pixel information of the displayed image into laser modulation synchronous to the scanning platform 314 to write the image information as displayed image 112 based upon the position of the output beam 324 in raster pattern 326 and the corresponding intensity and/or color information at the corresponding pixel in the image. Display controller 322 may also control other various functions of scanned beam display 100.

In one or more particular embodiments, the scanned beam display 100 as shown in and described with respect to FIG. 1 may comprise a pico-display developed by Microvision Inc., of Redmond, Wash., USA, referred to as PicoP™. In such embodiments, the light source 310 of such a pico-display may comprise one red, one green, and one blue laser, with a lens near the output of the respective lasers that collects the light from the laser and provides a very low numerical aperture (NA) beam at the output. The light from the lasers may then be combined with dichroic elements into a single white beam 312. Using a beam splitter and/or basic fold-mirror optics, the combined beam 312 may be relayed onto a mirror 316 of a biaxial MEMS scanning platform 314 that scans the output beam 324 in a raster pattern 326. Modulating the lasers synchronously with the position of the scanned output beam 324 may create the projected image 112. In one or more embodiments the scanned beam display 100, or engine, may be disposed in a single module known as an Integrated Photonics Module (IPM), which in some embodiments may be 7 millimeters (mm) in height and less than 5 cubic centimeters (cc) in total volume, although the scope of the claimed subject matter is not limited in these respects.

In one or more embodiments, to detect and track the position of optical device 120 of stylus 116, display controller 322 may drive a light emitting diode (LED) 336, which may comprise an infrared (IR) diode or the like so that its output beam 338 is not visible to the user and does not interfere with the viewability of the projected image 112. When beam 338 is reflected off an optical device 120 of the stylus 116 (or optical device 214 of finger 210), the reflected beam may be detected as position indicating beam 124 by a photodiode 340 coupled to display controller 322. In some embodiments, LED 336 may be disposed within light source 310 so that its output beam may be coincident with beam 312 and output beam 324 such that the position of the beam may be determined based on the timing of the drive signal driving scanning platform 314 and correlated with the position of output beam 324 in raster pattern 326, although the scope of the claimed subject matter is not limited in this respect. Furthermore, as discussed with respect to the styluses of FIG. 1, in some embodiments stylus 116 may comprise an active stylus as discussed herein. In one or more embodiments of a two-dimensional projector 110, a fast scan axis may refer to the horizontal direction of raster scan 326 and the slow scan axis may refer to the vertical direction of raster scan 326. Scanning mirror 316 sweeps the output beam 324 left and right at a higher frequency and also vertically at a relatively lower frequency. The result is a scanned trajectory of output beam 324 to result in raster scan 326. Each pixel in the displayed image 112 is illuminated by output beam 324 at the exact same instant in time within each frame. Because each and every pixel in the projected image is illuminated at the exact same time with respect to the start of the refresh frame, it is possible to determine the X-Y position of a given pixel simply by knowing its timing relative to the start of the refresh frame. In some embodiments, detector 128 may comprise an imaging device or camera, although the scope of the claimed subject matter is not limited in this respect.

Stylus 116 may be utilized to identify a selected pixel by placing the tip of the stylus 116 on the selected pixel in or proximate to displayed image 112 for determining the X-Y position of the pixel in displayed image 112. The output beam 324 illuminates the optical device 120 of stylus 116, which reflects a position indicating beam 124 detectable by photodiode 340. The timing of this illumination of photodiode 340 provides a pixel timing signal, and display controller 322 contains the timing information for the V-sync and H-sync timing signals. In order to correlate the timing pulses to compute the X-Y position of the selected pixel, the timing signals are available to an electronic circuit of display controller 322. In the embodiment of scanned beam display 100 shown in FIG. 3, display controller 322 may compute the X-Y position of a selected pixel based on having stylus 116 (or alternatively finger 210) reflecting a position indicating beam 124 with respect to a timing signal to display controller 322. The selected pixel illumination timing may be measured by using an optical device such as a retroreflector or similar reflector placed on the display surface 114 at or proximate to the selected pixel location. In one or more embodiments, this may be accomplished with a retroreflector 120 disposed on an end of stylus 116 or retroreflector 214 disposed on an end of finger 120. When the selected pixel is illuminated by output beam 324, retroreflector 120 will reflect some of selected pixel's light back toward scanned beam detector 128 of scanned beam display 100. In one or more embodiments, detector 128 may include a photodiode 314 that is capable of detecting this reflected light from retroreflector 120 as reflected position indicating beam 124 to generate an electrical pulse in response. The rising or falling edge of the electrical signal generated by photodetector 214 can be provided to display controller 122 to be used as a timing pulse for the pixel illumination. Display controller 122 at this point has the selected pixel timing signal from photodetector 214 to correlate to the V-sync and H-sync signals that display controller 122 already has or to correlate to the pixel output pipeline, of which the display controller 122 has a-priori knowledge.

In one or more embodiments the display controller 322 performs the position determination computation and may also communicate the X-Y position to a host computing device, for example to an information handling system 132 such as a personal computer (PC), tablet, or cellular telephone from which the image data displayed in displayed image 112 by scanned beam display may be provided. When the display controller 322 computes the pixel X-Y position, a retroreflector 120 equipped stylus 116 may be completely passive with no need for batteries, although the scope of the claimed subject matter is not limited in this respect. In one particular embodiment the information handling system 132 may comprise a cellular telephone having scanned beam display incorporated in the housing of the phone, therefore display controller 322 may compute the X-Y position since display controller 322 may already be closely connected to the cell phone via direct wired link 134, although the scope of the claimed subject matter is not limited in this respect.

In one or more embodiments, stylus 116 or finger 210 may be utilized in conjunction with scanned beam display 100 to implement the pointing function of a mouse as shown in and described with respect to FIG. 1 and/or FIG. 2. In one or more embodiments, other mouse functions may be implemented, for example conventional mouse buttons via gestures of one or more styluses or one or more fingers, wherein such gestures may be communicated back to the host device. In one or more embodiments, two or more optical devices comprising two or more retroreflectors may be utilized on a single stylus or finger, and an actuation of a mouse type button may be indicated by shadowing at least one of the optical devices from photodetector 340. In such an arrangement, display controller 322 may interpret the loss of a reflected position indicating beam 124 from one of the two or more optical devices as a button actuation. Such communication may comprise a passive optical communication link, thereby eliminating a need for batteries or other power source in the stylus 116, although the scope of the claimed subject matter is not limited in this respect.

Referring now to FIG. 4, a diagram of a scanned beam display capable of detecting inputs from multiple fingers as shown in FIG. 2 wherein the fingers include passive input devices in accordance with one or more embodiments will be discussed. In one or more embodiments, multiple optical devices 214 could be mounted on top of the fingernails of the user's fingers 210, where the optical devices 214 may comprise retroreflectors on multiple fingers for example. In one particular embodiment, this may be accomplished via a glove, ring, thimble, finger sleeve or similar device that the user wears to which the optical device is attached as a way to dispose the optical device 214 at the end of the user's finger approximately near the fingernail. However, the scope of the claimed subject matter is not limited in this respect. As discussed herein, scanned beam display 100 is capable of detecting when the optical devices 214 have been moved across a crossover line 130 and/or when the optical devices 214 have been moved in an unusual manner so that a more accurate X-Y position of the optical device 214 may be determined. An example of the effect of detecting multiple input sources in such a manner is shown in and described with respect to FIGS. 5A-5C, below.

Figure 5A:
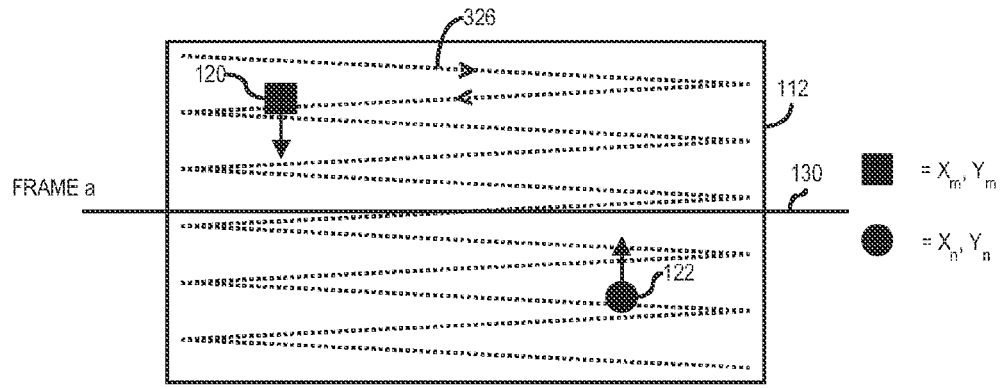
FIGS. 5A-5C are diagrams illustrating the effect of detecting multiple input sources across a crossover boundary in accordance with one or more embodiments.
Figure 5B:
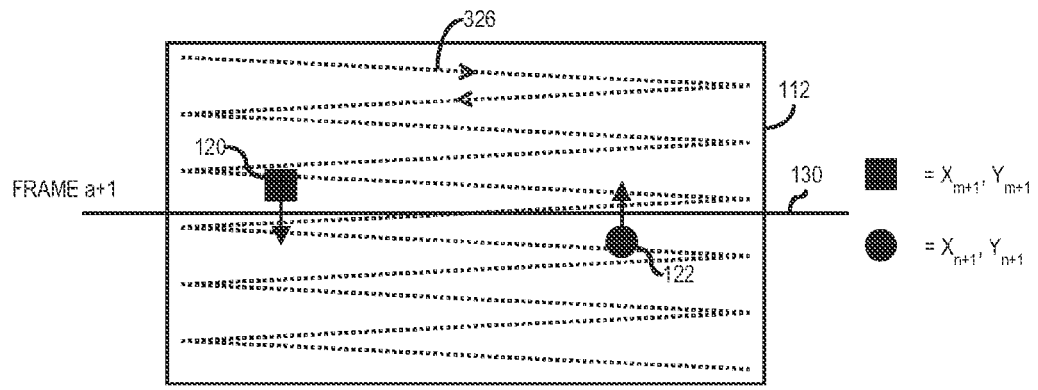
Figure 5C:
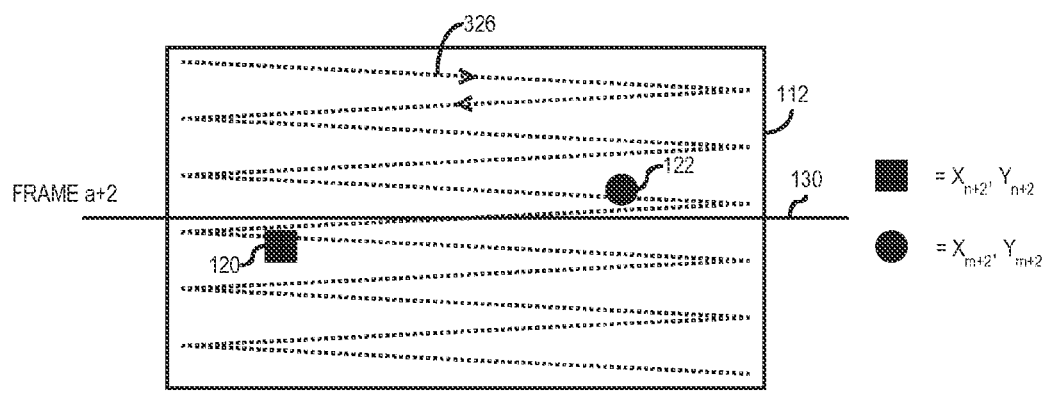

Referring now to FIGS. 5A-5C, diagrams illustrating the effect of detecting multiple input sources across a crossover boundary in accordance with one or more embodiments will be discussed. As shown in FIG. 5A, the X-Y positions of multiple input sources corresponding to optical device 120 and optical device 122 may be detected with respect to the projected image 112 generated by raster scan 326. At a first time in FRAME a, the position flag of optical device 120 may correspond to an X-Y value wherein its position flag is $X_m$, $Y_m$. Likewise, the position flag of optical device 122 may correspond to an X-Y value wherein its position flag is $X_n, Y_n$. In general, the X-Y coordinate position of the position flag may refer to a central locus of the optical device such as the center or the centroid of the optical device and/or its image. A centroid may refer to a geometric center, of a planar two-dimensional shape. In some embodiments, the centroid may refer to the barycenter of the shape. In other embodiments, the X-Y coordinates may refer to any select point of the shape, and the scope of the claimed subject matter is not limited in this respect. As the optical devices are moved within the region of the displayed image toward the crossover line 130, so long as the optical devices do not cross the crossover line 130, the positions of the optical devices may still be computed as their detected X-Y positions. Thus, at FRAME a+1 as shown in FIG. 5B, the position flag of optical device 120 may be $X_{m+1}, Y_{m+1}$, and the position flag of optical device 122 may be $X_{n+1}, Y_{n+1}$. When the optical devices are moved across the crossover line 130 as shown at FIG. 5C in FRAME a+2, the detected coordinate positions may be inadvertently reversed such that the position of optical device 122 becomes $X_{m+2}$, $Y_{m+2}$ and the position of optical device 120 becomes $X_{n+2}$, $Y_{n+2}$. In other words, the calculated positions of optical device 120 and optical device 122 inadvertently get exchanged. The reason such "swapping" might happen is due to the nature by which the coordinates of the input devices are detected, tagged to or associated with an input device, and passed along to the application layer. This tagging occurs in the time domain, and temporal separation between the input devices is what yields a unique tag. However, when the input device violates this temporal relationship if the relative positions of the input devices along the raster scan are swapped, then their tags will also be inadvertently swapped. In one or more embodiments, the scanned beam display 100 is capable of determining when the multiple input sources are moved across the threshold line 130, and if that happens, the scanned beam display 100 is capable of correcting for the calculated positions such that the input sources are assigned to their correct coordinate positions. An example of how movement of the multiple input sources across the crossover line 130 is detected and accommodates is shown in and described with respect to FIGS. 6A and 6B, below.

Referring now to FIGS. 6A-B, diagrams illustrating an approach to accounting for multiple input sources using a history between successive frames in accordance with one or more embodiments will be discussed. As shown in FIG. 6A, at a first time in FRAME a, the position flag of optical device 120 at time "a" may correspond to an X-Y value of $X_m$, $Y_m$. Likewise, the position flag of optical device 122 may correspond to an X-Y value of $X_n$, $Y_n$. As shown in FIG. 6B, at a second time in FRAME a+1, as the optical devices are moved within the region of the displayed image 112 across the crossover line 130, the nominal, temporary position flag of optical device 120 at time "a+1" should be $X_{n+1}$, $Y_{n+1}$, and the nominal, temporary position flag of optical device 122 at time a+1 should be $X_{m+1}$, $Y_{m+1}$. In order to track and assign the proper coordinates to optical device 120 and optical device 122, scanned beam display 100 may make the following calculation. Maintaining a history between successive frames is one approach to address position tracking. The centroid detection can be applied in the same manner as shown in and described with respect to FIGS. 5A-5C, and additionally qualify the source of the centroids and only pass the centroid data with the appropriate flags on every second frame, or alternatively every third frame depending on latency settings. A threshold may be defined as an absolute maximum distance a pointer can have realistically been displaced in successive frames from FRAME a to FRAME a+1. Alternatively, a velocity threshold may be defined separately or in combination with the distance threshold. In some embodiments, a threshold may comprise a defined radius of pixels. If between successive frames a particular input source moves by greater than that threshold radius of pixels, then it is likely that a noise event may have occurred, or the case of incorrect tagging arising out of a crossover scenario. A noise event may refer to any unwanted, inadvertent, or spurious perturbation or input that may be detected by detector 128. In one or more embodiments, noise may be defined versus signal on subsequent frames. For example, a new reflector P may enter the frame in which reflectors M and N are already being tracked. In order to distinguish the new reflector from noise, the system may wait for at least one or more frames. By waiting for at least one frame, when all three reflectors are detected again in the next frame, what was originally noise due to the introduction of new reflector P now becomes signal. In some embodiments, in the event that two identical or similar styluses are introduced into the display cone, one or both input devices may be detected as noise, in which case the system may provide a warning to indicate that it may have trouble distinguishing between the two input devices. In some embodiments, the threshold may comprise a velocity parameter wherein if between successive frames m and n if an input source has a velocity dx/dt where dx is the difference $X_m-X_n$ for the X coordinate and dt is the difference $T_m-T_n$ being the time instance along the raster scan or pixel position in the time domain along the raster scan. A threshold for velocity may be set which if exceeded will either indicate a crossover event or a noise event.

If the optical devices traverse across a crossover line 130, and if the threshold is violated, an indication is made that an unrealistic jump has happened for the optical devices, and the flags may be exchanged so that the correct flag is associated with the correct coordinates being passed to an application layer. For dual point touch with two input sources, the position tags for each input source may be exchanged, or swapped. For three or more input sources, a history stack for each of the input sources may be maintained from frame to frame for the present frame and one or more previous frames. If one or more violations occur between frames, a determination may be made from the history stack which pointers have experienced a violation and the positions of the input devices that have experienced a violation may be corrected. If multiple violations have occurred, the nearest likely correct position for the input devices may be determined based on the history stack. If may be the case that multiple input devices have exchanged orders, for example tag 1, tag 2 and tag 3 now have the positions of tag 2 tag 3 and tag 1, respectively. Examining the history stacks of the three input sources may determine the correct association of coordinates for the three respective tags, and the coordinates for the tags may be re-assigned accordingly. Furthermore, by examining the history stacks of the input sources, the movements of the input sources may be monitored and their movements may be extrapolated based on the previous history of movement of the input devices based on their respective history stacks. Such an arrangement allows for the positions of the input devices to be tracked along the extrapolated path at a speed calculated from the history stacks, for example where the position of the input device is temporarily lost such as when a user or an object is temporarily interposed between the projector 100 and the input device. Furthermore, by tracking movements of the input devices, the system may be able to distinguish between two input different devices that may happen to have the same or similar shapes. The movement of the input devices may be presumed for a predetermined number of frames by extrapolation of the motion vectors or optical flow in an image buffer being utilized for input source detection. Such extrapolation may be applied where two input devices converge, and it may be determined whether the input devices have crossed paths, or whether the two input devices have converged and then subsequently diverged. In the event that projector 100 is unable to distinguish the positions of two or more input devices based on extrapolation of the movements, then the projector 100 may utilize one or more other methods to determine the locations of the input sources, for example via shape detection as shown in and described with respect to FIG. 8, below, although the scope of the claimed subject matter is not limited in this respect.

Thus, in one or more embodiments, if the difference in positions between a first position to a second position is greater than a threshold amount, or the optical devices exceed a threshold velocity in their movement, then the position flag for optical device 120 is now assigned as the position flag of the other optical device 122 by swapping of their coordinates. Likewise, the position flag for optical device 120 is now assigned as the position flag of the other optical device 120 via the swapping of their coordinates. Otherwise, if the threshold is not exceeded, then the position flags may remain with the current optical devices wherein the position flag for the first optical device 120 is its nominal, temporary value and the position flag for the second optical device 122 is its nominal, temporary value. It should be noted that the formula for detecting a crossover and/or detecting exceeding a threshold is merely one example, and the scope of the claimed subject matter is not limited in this respect.

Referring now to FIG. 7, a diagram illustrating an alternative approach to tracking multiple input sources using interframe motion analysis in accordance with one or more embodiments will be discussed. As shown in FIG. 7, the reflected features of optical devices 120 and 122 in each frame may be returned as raw data and a buffer image of the reflected features may be created. Then, classical image processing algorithms may be applied the raw data of the buffer image to determine the motion of the optical devices between successive frames via motion vectors. The motion vectors may be generated in image and/or video processing for inter-frame motion analysis. The image data may be received by an inter-frame motion analysis circuit 710 from which motion vectors m1 and m2 may be generated motion vectors circuit 712. If the motion vectors that are generated violate the magnitude of a predefined threshold as determined by threshold comparator circuit 714, the flags for the multiple input sources may be exchanged to result in the more likely position flags assigned to a given optical device. In some embodiments, the user may hold the stylus at various positions within the display cone and not necessarily at or near the plane of the projection surface 114. In such a case, movements closer to the display 100 may result in proportionally larger movements of the input device as detected by detector 128. In order to address such larger movements with motion vectors, the stylus 116 may include a proximity sensor to detect a distance of the input device from the display 100, so that application 136 may make a correction via software, or the display 100 may indicate to the user to move the stylus 116 closer to the projection surface 114. It should be noted that inter-frame motion analysis as shown in FIG. 7 is merely one example of how multiple input sources may be tracked, and the scope of the claimed subject matter is not limited in this respect.

Referring now to FIG. 8, a diagram illustrating an alternative approach to tracking multiple input sources using shape detection analysis in accordance with one or more embodiments will be discussed. As shown in FIG. 8, the reflected features in successive frames may be capture by photodiode 340 or a similar detector such as a camera and returned as raw data and a buffer image created. A shape detector circuit 814 may be utilized to for shape detection of the reflected image data from the optical devices 120 and 122 by applying shape detection image processing algorithms. A centroid detector 816 may be then used to calculate a centroid for the detected shapes determine if an optical device 120 has moved greater than a threshold amount and/or if its movement has exceeded a threshold velocity. In one or more embodiments, any of the approaches discussed herein in FIGS. 6A-6B, FIG. 7, or FIG. 8 may be implemented individually or in combination with one or more of the other approaches. For example, the approach of FIG. 8 may be performed first, and if not successful then the approach of FIG. 7 may then be performed, and if not successful, the approach of FIGS. 6A-6B may be performed, although the scope of the claimed subject matter is not limited in this respect. Shape detection may lend itself well where application 136 is a multi-player game as an example. Shapes can enter the projection cone asynchronously at any discrete time with no dependency on the presence or absence of another shape in the projection cone. For example, the shape itself may be utilized as a flag to push back to the application 136 the coordinate in a codified manner so that the application 136 recognizes which player is currently active in the game environment. To this end, the optical devices may have unique shapes that allow the application 136 to identify the player via the shape of his or her optical device. For example, optical device 120 may comprise a square shape, optical device 122 may comprise a circle shape, optical device 810 may comprise a hexagon shape, and optical device 812 may comprise a star shape, to list just a few of several examples. In the shape detection embodiment shown in FIG. 8, the two-dimensional (2D) projection of any shape under any reasonable rotation along any degree of freedom will yield a resulting 2D shape that is a unique signature for that input source that is capable of being detected and uniquely identified by display 100 and/or application 136. Such an arrangement allows for detecting, identifying, and tracking multiple input sources. Furthermore, in some embodiments the optical devices may comprise two-dimensional shapes as input sources as shown for example in FIG. 8, and in alternative embodiments the optical devices may comprise three-dimensional shapes as input sources. For example, three-dimensional optical devices may comprise a convex shape such as a sphere, a perfect geometric solid such as a cube or a dodecahedron, or a concave shape such as a concave equilateral pyramid. However, these are merely example shapes for the optical devices, and the scope of the claimed subject matter is not limited in this respect.

Referring now FIG. 9, a flow diagram of a method to track and accommodate multiple input sources in accordance with one or more embodiments will be discussed. The method 900 of FIG. 9 may be utilized to implement any of the approaches for tracking multiple input sources as discussed herein, and may include more or fewer blocks than shown, and/or the blocks may be arranged in various orders, and the scope of the claimed subject matter is not limited in this respect. An image 112 may be projected at block 910 onto a projection surface 114. At block 912, all or nearly all of the multiple input sources such as styluses 116 and 118 and/or fingers 210 and 212 may be detected and identified. The spatial correlation of the temporal data for the detected sources may occur at block 914, and the multiple input sources may be discerned or identified at block 916. If the multiple input sources are discerned or identified at block 916, then method 900 continues at block 926, below, otherwise method 900 continues at block 918 wherein the positional data of each or at least some of the multiple input sources may be processed. Then, the multiple input sources may be tagged and their movements tracked at block 920. A determination may be made at decision block 922 whether a distance and/or velocity threshold has been made. If a threshold violation has not been detected at block 922, then method 900 may continue at block 926 wherein position information and the tags are passed to the application layer for handling by application 136. In the event a threshold violation has been detected at block 922, then a cross-over condition is detected, and the position data between the multiple input sources may be exchanged and re-associated with the correct tags to reflect the proper position data for the respective input sources, and the exchanged position data and tags may be passed to the application layer at block 926 wherein method 900 may continue at block 912 to continue detecting and tracking the multiple input sources and the movement thereof.

Referring now to FIG. 10, a diagram of a scanned beam display or the like capable of detecting and tracking multiple input sources wherein the detector is decoupled from the projector in accordance with one or more embodiments will be discussed. The input source detecting and tracking system of FIG. 10 is substantially similar to the system shown in and described with respect to FIG. 1, except that in FIG. 10 the detector 128 is decoupled from the display 100 and projector 110, for example wherein the detector 128 is provided within its own housing. In such an embodiment, the display cone 1016 may be offset from the detection cone 1018. Thus, in one or more embodiments, the display cone 1018 is offset from the detection cone 1018, and the timing of the scanning elements of the projector 110 and the detector 128 may be synchronized, for example as shown in and described with respect to FIG. 3, above. In one or more embodiments, detector 128 may be coupled to display 100 and/or projector 110 via link 1010 which may be a wired or a wireless link. Furthermore, detector 128 may be coupled to application 136 which may be running on projector 100 where projector is implemented as an information handling system embodiment, and/or may be coupled to an external information handling system 132 that is implemented as a separate device from the projector 100, for example where information handling system 132 comprises a personal computer or the like. However, these are merely example arrangements for detector 128, and the scope of the claimed subject matter is not limited in these respects.

In one or more embodiments, the image projected by projector 110 may be defined to comprise an image in one or more embodiments, and may alternatively be defined to not comprise an image in one or more alternative embodiments. In such alternative embodiments, the display cone 1016 comprises a projected cone of light that does not necessarily contain an "image" as its content. The light may comprise visible, barely visible light, or invisible light that nevertheless may be detectible by detector 128 via appropriate circuitry disposed in detector 128. In some embodiments, the projection surface 114 may comprise a surface that is capable of absorbing all, or nearly all, of the light of display cone 1016. For example, the projection surface 114 may comprise a black felt surface. In such embodiments, the user essentially does not see any reflected light or image, and the detector 128 essentially sees only light reflected off of the input sources such as optical device 120, or other optical device 1012 disposed on any arbitrary object 1014 as the position indicating beams 124 and 126.

For example, projector 110 and detector 128 may be mounted under a kitchen cabinet facing downwards. A small child may play with different farm animal figurines on the counter below the display cone 1016 and the detection cone 1018. In such embodiments, the object 1014 may comprise an animal figurine, and the optical device 1012 may comprise a glyph or a pattern of glyphs on the animal figurine. The application 136 on information handling system 136 may identify the particular farm animal based on detecting and identifying the particular glyph on the figurine via information handling system 132. Different animal sounds may be generated from audio speakers coupled to information handling system 132 corresponding to the sound that the identified animal makes, for example via a lookup table of farm animal sounds stored in the information handling system 132. As an example, if the animal figurine is a cow, the glyph optical device 1012 on the cow figurine may be detected via detector 128 and passed to application 136 which identifies the figurine as a cow. In response to the child placing the cow figurine in detection cone 1018, the application 136 causes the information handling system 132 to play a "moo" sound through the speakers. Likewise, a glyph/optical device 1012 on a duck figurine may play a "quack". The glyph optical devices 1012 on the figurines may comprise a retroreflector material or the like wherein their shapes are recognized by image detection or edge detection, although the scope of the claimed subject matter is not limited in this respect. Furthermore, in one or more embodiments, relative placement of the figurines may also trigger various responses. For example, kitten figurines may trigger a purring sound when placed proximate to a mother cat figurine, or the kitten figurines may trigger crying sounds when placed too far away from the mother cat figurine. In general, the light generated by projector 110 may any type of light suitable for detection by detector 128, for example a full frame of low, gray scale light, any one or more color of a red, green, or blue (RGB) light or combinations thereof, that is sufficiently dim to be undetectable, or nearly undetectable, by the user, and not necessarily an image. In other embodiments, the light may comprise invisible light such as infrared or ultraviolet light. Furthermore, application 138 may comprise various types of games or other touch or multitouch applications. However, these are merely the example types of light that may be utilized by projector 110, and/or the applications thereof, and the scope of the claimed subject matter is not limited in this respect. In any event, the embodiments shown in FIG. 10 are capable providing multitouch, multiplayer, and/or multiobject detection and recognition using retroreflectors or the like, and the scope of the claimed subject matter is not limited in these respects.

Referring now to FIG. 11, a diagram of a scanned beam display or the like capable of maintaining the image in a fixed orientation while the projected area is moved in accordance with one or more embodiments will be discussed. As shown in FIG. 11, a projection surface 114 may have two or more input devices 1110 and 1112 attached thereto, and display 100 may project an image 112 onto the projection surface 114. For example, input devices 1110 and 1112 may comprise retroreflectors having a sticker, magnet, Velcro™, or similar backing, which would allow a user to affix the input devices 1110 and 1112 to the projection surface 1114. In the embodiment shown in FIG. 11, if the projector 100 is moved or rotated with respect to the input devices 1110 and 1112, thereby causing movement or rotation of the display cone 1016, the horizon 1114 in the image 112 may remain in place, such that the contents 1116 of the displayed image 112, for example a city in display in the image, may remain stationary. Thus, inadvertent movements of the projector 100 will not result in inadvertent movements of the displayed image. Such an embodiment may be referred to as image stabilization and may be useful for a presentation to an audience, for example if someone accidentally bumps the table on which the projector 110 is resting, the projected image 112 will not be disturbed. Likewise, if the projector 100 is being held in the hand of the presenter, the projected image 112 may remain stabilized even if the presenter does not have a steady hand. In other embodiments, the projected image 112 may remain stable as part of a game being played and projected by the projector 100. In such embodiments, the projector 100 may be held in the hand of the game player, and movement of the projector 100 may be part of the game play. In such embodiments, the game environment of the projected image 112 may remain stationary while the user moves projector 100 and display cone 1016. In any event, such embodiments as shown in FIG. 11 may allow the horizon 1114 and/or the contents 1116 of the displayed image 112 to remain stationary when the projector 100 and display cone 1016 are moved with respect to input devices 1114 and 1112 without requiring or involving the use or gyroscopes, although the scope of the claimed subject matter is not limited in this respect.

Referring now to FIG. 12, a diagram of a scanned beam display or the like capable of maneuvering a vehicle within the image by maintain the vehicle in a fixed position while the projected image is moved with respect to the vehicle via movement the projected area in accordance with one or more embodiments will be discussed. As shown in FIG. 12, two or more input devices 1210, 1212, 1214, and/or 1216 may be attached to projection surface such as discussed with respect to FIG. 12, above, for input devices 1110 and 1112. A vehicle 1218 or other moving object may be projected in the projected image 112. Retroreflector 1214 is nominally a cursor, and this becomes a center point of the image, while the projector itself can be moved to change perspectives seen by the user with respect to the cursor. For example, the cursor could be a military helicopter, and in order to negotiate topography or avoid enemy anti-aircraft fire, the projector itself can be moved. This motion is perceived as the cursor moving relative to the image boundaries, although in this case it is the boundary and not the cursor/reflector which is in motion. Thus, the user may redirect the projector 100 and the projection cone 1016 until the vehicle 1218 is coincident with one of the input devices 1214. At that point, the vehicle 1218 may remain stationary within the projected image 1112. As the user then moves the display 100 and the projection cone 1016, the vehicle 1218 will remain stationary, and background 1220 of the projected image 112 moves with respect to the stationary vehicle 1218 so that the user may maneuver the vehicle 1218 around in the background 1220 as the vehicle 1218 moves around in the projected image 112. Thus, for example the vehicle 1218 may comprise a helicopter gunship and the projected image 112 may comprise an aerial view of the background as the projected content 1220. Movement of the display 100 and the display cone 116 moves the projected content 1220 with respect to the stationary helicopter, thereby allowing the user to control the movement of the helicopter. This example is a top down, god's eye game, but driving games or first- or third-person perspective renderings are also possible. Additional retroreflectors outside the boundaries of the frame can become the nominal center point if the motion of the projector exceeds the field of reflection between a reflector and detector 128. For example, 1216 and 1210 are not in the same projection cone at the same time, in this illustration. Other means of handing off the nominal center point between multiple reflectors can be imagined. For instance, such handing off may be controlled by button push, verbal command, or passive order of precedence. In some embodiments, multiple input devices may be affixed to the projection surface 114 so that the playing surface may be extended, for example to a larger portion of the projection surface 114 and/or on to multiple walls in a room as shown in and described with respect to FIG. 13, below. Furthermore, the input sources may comprise different shapes and the game play, game modes and/or projected content 1220 may change based on the vehicle 1218 being fixed to a selected input device, and/or by moving the display cone 1016 such that the projected image 112 covers the selected input device. However, these are merely example applications of the embodiments shown in FIG. 12, and the scope of the claimed subject matter is not limited in these respects.

Referring now to FIG. 13, a diagram using multiple surfaces of a room as a projection surface for implementing a virtual display in accordance with one or more embodiments will be discussed. As shown a room may have multiple surfaces that may be utilized as projection surfaces 114. The walls may have various arrays of input devices, such as array 1310, array 1312, array 1314, and/or array 1316 disposed thereon wherein each of the walls, the floor, and/or the ceiling may be utilized as a projection surface. In such an arrangement, the user may point the display 100 and the display cone 1016 onto any of the available surfaces for projecting an image and/or for game play such that up to a full 360 degree virtual environment may be provided. In some embodiments, the arrays of input devices may comprise different shapes to assist the application in correlating the position of the display 100 and the display cone 1016 on a given surface and which surface the projected image is being projected with the proper content to be displayed in the projected image. Such an arrangement may further be utilized in conjunction with either of the embodiments shown in and described with respect to FIG. 11 or FIG. 12, above, although the scope of the claimed subject matter is not limited in this respect.

Referring now to FIG. 14, a diagram of using a projector to provide closed loop position control of a physical object in accordance with one or more embodiments will be discussed. As shown in FIG. 14, a physical object 1414 may have two or more input sources 1410 and 1412 disposed thereon. The projector 110 projects a display cone 1016 onto the object 1414 so that the object 1414 is encompassed within displayed image 112. It should be noted that, as discussed above, a displayed image 112 need not be an actual image, but merely some type of light, visible or invisible, that is suitable for detection by detector 128 within detection cone 1018. The detector 128 detects the position indicating beams 124 and 126 from the input devices 1410 and 1412, which may comprise retroreflectors for example. An application 136 running on the display 100, or within an externally coupled information handling system 138 as shown for example in FIG. 1, detects the position, orientation, and/or alignment of the object 1414 based on the detected positions of the input sources 1410 and 1412 within the projected image 112. The display 100 may be coupled to one or more servomotors 1416 to control the movement, position, and/or alignment of the object 1414, and the updated position of the object 1414 may be detected by the display 100 and/or application 136. If the object 1414 is still not in a desired position, orientation, and/or alignment, the servomotor 1416 and display 100 may operate in a closed loop mode until the object 1414 is in a desired position, orientation, and/or alignment. It should be noted that the light projected by projector 110 may comprise any type of light such as visible light in lower light levels or colors, or may comprise invisible light such as infrared or ultraviolet light, and the scope of the claimed subject matter is not limited in this respect.

Referring now to FIG. 15, a diagram of geometric image correction and/or warping of projected content displayed on a projection surface in accordance with one or more embodiments. As shown in FIG. 15, display 100 may be oriented such that the projector 110 projects the display cone 1016 at an off angle from a line normal to the surface of the projection surface 114. In such an arrangement, the resulting projected image may be skewed and not square with respect to the projection surface. By having two or more input sources 1510, 1512, 1514 and/or 1516 affixed to the projection surface 114, the detector 128 may detect the positions of two or more of the input sources and so that the an application 136 may determine the amount of skewing distortion in the projected image 112 so that the application 136 may apply geometric correction and/or image warping to the projected image 112 so that the resulting corrected image 1518 may be distortion free or nearly distortion free and square, or nearly square, with respect to the projection surface. In one or more embodiments, the dimensions of the corrected image 1518 may match, or nearly match, the aspect ratio of the original source image, for example a 16:9 aspect ratio, or the dimensions may have a different size and/or aspect ratio. In some embodiments, the corrected image 1518 may be displayed horizontally. In other embodiments, the corrected image 1518 may be projected in any rotational orientation, and furthermore may be adapted to the particular projection surface such as a pillar, sloped surface, or a ceiling. In one more embodiments, the application 136 may define the possible dimensions of the corrected image 1518. For example, the dimensions of the projected image 1518 may be defined as a maximum rectangle, including squares, inscribed within four points defined by the input sources 1510, 1512, 1514 and/or 1516, or a potential limit based on the aspect ratio of the source image. Alternatively, the dimensions of the projected image 1518 may be based on various shapes defined by the user or the application 136 such as a circle, an ellipse or similarly distorted circle. In such embodiments, the size and/or aspect ratio of the projected image 1518 may be defined as a maximum circle that can be inscribed within the extent of the input 1510, 1512, 1514 and/or 1516. However, these are merely example possible sizes, shapes, and/or aspect ratios for the corrected image 1518, and the scope of the claimed subject matter is not limited in these respects.

Referring now to FIG. 16, a diagram of a projection system utilized to implement pinch zooming and/or rotating of projected content in accordance with one or more embodiments will be discussed. The embodiment shown in FIG. 16 is substantially similar to the embodiments shown in and described with respect to FIG. 1 and FIG. 4, except that the user's hand 210 may have two input devices 1610 and 1612 on two fingers, for example an index finger and a thumb. In such an arrangement, the user may apply pinch zoom and/or rotation functions to control the projected image 112 via detection of the location and movement of the input devices 1610 and 1612. The input devices 1610 and 1612 may comprise retroreflectors disposed at the ends of the user's fingers, such as on a ring or thimble, or by being affixed to a glove that the user wears on his hand 210. As an example, the user may move his fingers apart at a given location in the displayed image, thereby moving the input devices 1610 and 1612 apart. The movement of the input devices 1610 and 1612 is detected by the detector 128, and passed to the application 136 which may zoom in on the projected image 112 at the location of the input devices 1610 and 1612. Likewise, the image may be zoomed out by moving the input devices 1610 and 1612 together, the image may be rotated by rotating one input device with respect to the other, and/or the user may navigate in any direction in the image by moving one or more of the input devices. Furthermore, other input functions may be implemented via a combination of gestures or movements of the input devices. However, these are merely example input functions that may be made with the two or more input devices 1610 and 1612 disposed on the ends of two or of the user's fingers, and the scope of the claimed subject matter is not limited in these respects.

Referring now to FIG. 17, a block diagram of an information handling system coupled to a scanned beam display to track and accommodate multiple input sources in accordance with one or more embodiments will be discussed. Information handling system 132 of FIG. 17 may represent an architecture for several types of computing platforms, including cell phones, personal digital assistants (PDAs), netbooks, notebooks, internet browsing devices, tablets and so on, wherein information handling system 132 may include more or fewer elements and/or different arrangements of the elements than shown in FIG. 17 depending on the particular device, and the scope of the claimed subject matter is not limited in these respects. Information handling system 132 may comprise one or more processors such as processor 1710 and/or processor 1712, which may comprise one or more processing cores. One or more of processor 1710 and/or processor 1712 may couple to one or more memories 1716 and/or 1718 via memory bridge 1714, which may be disposed external to processors 1710 and/or 1712, or alternatively at least partially disposed within one or more of processors 1010 and/or 1712. Memory 1716 and/or memory 1718 may comprise various types of semiconductor based memory, for example volatile type memory and/or non-volatile type memory. Memory bridge 1714 may couple to a video/graphics system 1720 to drive a display device, which may comprise scanned beam display 100, coupled to information handling system 132. In one or more embodiments, video/graphics system 1720 may couple to one or more of processors 1710 and/or 1712 and may be disposed on the same core as the processor 1710 and/or 1712, although the scope of the claimed subject matter is not limited in this respect.

Information handling system 132 may further comprise input/output (I/O) bridge 1722 to couple to various types of I/O systems. I/O system 1724 may comprise, for example, a universal serial bus (USB) type system, an IEEE 1394 type system, or the like, to couple one or more peripheral devices to information handling system 132. Bus system 1726 may comprise one or more bus systems such as a peripheral component interconnect (PCI) express type bus or the like, to connect one or more peripheral devices to information handling system 132. A hard disk drive (HDD) controller system 1728 may couple one or more hard disk drives or the like to information handling system, for example Serial Advanced Technology Attachment (Serial ATA) type drives or the like, or alternatively a semiconductor based drive comprising flash memory, phase change, and/or chalcogenide type memory or the like. Switch 1730 may be utilized to couple one or more switched devices to I/O bridge 1722, for example Gigabit Ethernet type devices or the like. Furthermore, as shown in FIG. 17, information handling system 132 may include a baseband and radio-frequency (RF) block 1732 comprising a base band processor and/or RF circuits and devices for wireless communication with other wireless communication devices and/or via wireless networks via antenna 1734, although the scope of the claimed subject matter is not limited in these respects.

In one or more embodiments, information handling system 132 may include a scanned beam display 100 as shown in FIG. 1, FIG. 2, and/or FIG. 3, and which may include any one or more or all of the components of scanned beam display 100 such as display controller 322, horizontal drive circuit 318, vertical drive circuit 320, and/or light source 310. In one or more embodiments, scanned beam display 100 may be controlled by one or more of processors 1710 and/or 1712 to implement some or all of the functions of display controller 322 of FIG. 3. In one or more embodiments, scanned beam display 100 may be disposed in the same housing as information handling system 132 or disposed external thereto, and may comprise a projector 110 and detector 128 for projecting an image and tracking the movements of one or more optical devices 120 disposed in a stylus 116 (or finger 210). In one or more embodiments, information handling system 132 may comprise video/graphics block 1020 having a video controller to provide video information 1738 to display 100 to display a projected image 112. In one or more embodiments, display 100 and/or information handling system 132 may be capable of detecting, tracking, and accommodating the movements of multiple optical devices as discussed herein. However, these are merely example implementations for display 100 within information handling system 132, and the scope of the claimed subject matter is not limited in these respects.

Although the claimed subject matter has been described with a certain degree of particularity, it should be recognized that elements thereof may be altered by persons skilled in the art without departing from the spirit and/or scope of claimed subject matter. It is believed that the subject matter pertaining to multipoint source detection and tracking in a scanned beam display or the like and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A method, comprising:
   projecting a projection cone onto a projection surface;
   detecting movements of two or more input sources with respect to projection cone;
   wherein the input sources have a unique tag based on a temporal relationship along a raster scan;
   determining whether the input sources have crossed a crossover line in the projection cone; and
   when the input sources have moved greater than a threshold amount after crossing the crossover line, exchanging the position data between the input sources to reflect proper position data for the input sources.

2. A method as claimed in claim 1, wherein said determining comprises maintaining a history between successive projections to track position data for the input sources.

3. A method as claimed in claim 1, wherein said determining comprises obtaining image data from the input sources to create an image buffer and applying inter-frame motion analysis to the data in the image buffer to obtain motion vectors of the movements of the input sources.

4. A method as claimed in claim 1, wherein said determining comprises obtaining image data from the input sources to create an image buffer and applying shape detection image processing to the data in the image buffer to obtain the movements of the input sources.

5. A method as claimed in claim 1, wherein the input sources comprise optical devices disposed on a stylus, a finger, a pointing device, or a glyph, or combinations thereof.

6. An apparatus, comprising:
   a projector to project a projection cone onto a projection surface;
   a detector to detect positions of two or more input sources with respect to the projection cone;
   wherein the input sources have a unique tag based on a temporal relationship along a raster scan;
   a controller to determine whether the input sources have crossed a crossover line in the projection cone;
   wherein the controller exchanges the position data between the input sources to reflect the proper position data for the input sources when the input sources have moved greater than a threshold amount after crossing the crossover line.

7. An apparatus as claimed in claim 6, wherein the detector comprises a photodetector to detect a position indication beam reflected off the two or more input sources.

8. An apparatus as claimed in claim 6, wherein the detector comprises an imaging device to detect an image of the multiple input sources.

9. An apparatus as claimed in claim 6, wherein the detector comprises a photodetector to detect a position indication beam reflected off the two or more input sources from the projector.

10. An apparatus as claimed in claim 6, wherein the input sources comprise optical devices disposed on a stylus, a finger, or a pointing device, or combinations thereof.

11. A method, comprising:
    projecting a projection cone onto a projection surface;
    detecting positions of two or more input sources;
    wherein the input sources have a unique tag based on a temporal relationship along a raster scan;
    determining whether the input sources have crossed a crossover line in the projection cone;
    wherein said projecting comprises projecting from a first device, and said detecting comprise detecting from a second device that is spatially decoupled from the first device;
    when the input sources have moved greater than a threshold amount with respect to the projection cone after crossing the crossover line, exchanging the position data between the input sources to reflect the proper position data for the input sources.

12. A method as claimed in claim 11, wherein said determining comprises maintaining a history between successive frames of the image to track position data for the input sources.

13. A method as claimed in claim 11, wherein said determining comprises obtaining image data from the input sources to create an image buffer and applying inter-frame motion analysis to the data in the image buffer to obtain motion vectors of the movements of the input sources.

14. A method as claimed in claim 11, wherein said determining comprises obtaining image data from the input sources to create an image buffer and applying shape detection image processing to the data in the image buffer to obtain the movements of the input sources.

15. A method as claimed in claim 11, wherein the input sources comprise optical devices disposed on a stylus, a finger, a pointing device, or a glyph, or combinations thereof.

16. An information handling system, comprising:
    a processor and a memory coupled to the processor to store image data;
    a projector to project a projection cone onto a projection surface;
    a detector to detect movements of two or more input sources with respect to the projection cone;
    wherein the input sources have a unique tag based on a temporal relationship along a raster scan;
    a controller to determine whether the input sources have crossed a crossover line in the projection cone;
    wherein the controller exchanges the position data between the input sources to reflect the proper position data for the input sources when the input sources have moved greater than a threshold amount after crossing the crossover line.

17. An information handling system as claimed in claim 16, wherein the controller passes the position data to an application stored in the memory and executed by the processor.

18. An information handling system as claimed in claim 16, wherein an application executed by the processor is configured to determine whether the input sources have crossed the crossover line in the projection cone and to exchange the position data between the input sources to reflect the proper position data for the input sources when the input sources have moved greater than a threshold amount after crossing the crossover line.

* * * * *